United States Patent
Zhang et al.

(10) Patent No.: US 12,335,747 B2
(45) Date of Patent: Jun. 17, 2025

(54) POLARIZATION SIGNALING IN LINE-OF-SIGHT PATH DETECTION

(71) Applicant: QUALCOMM Incorporated, San Diego, CA (US)

(72) Inventors: Danlu Zhang, Rancho Santa Fe, CA (US); Sony Akkarakaran, Poway, CA (US); Amichai Sanderovich, Atlit (IL); Bala Ramasamy, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/460,604

(22) Filed: Aug. 30, 2021

(65) Prior Publication Data
US 2023/0066605 A1   Mar. 2, 2023

(51) Int. Cl.
*H04W 16/24*   (2009.01)
*G01S 3/72*   (2006.01)

(52) U.S. Cl.
CPC .................. *H04W 16/24* (2013.01)

(58) Field of Classification Search
CPC ... H04W 64/003; H04W 16/24; H04W 16/32; G01S 5/0036; G01S 5/0218; G01S 5/0054; G01S 3/72
See application file for complete search history.

(56) References Cited

U.S. PATENT DOCUMENTS

| | | | | |
|---|---|---|---|---|
| 10,868,609 | B1 * | 12/2020 | Kossin | H04B 7/10 |
| 2003/0103771 | A1 * | 6/2003 | Atmur | H04J 14/06 |
| | | | | 398/152 |
| 2013/0194950 | A1 * | 8/2013 | Haghighat | H04L 5/0035 |
| | | | | 370/252 |
| 2015/0382318 | A1 * | 12/2015 | Kim | G01S 5/0054 |
| | | | | 455/456.5 |
| 2020/0119788 | A1 * | 4/2020 | Huang | H04B 7/0486 |
| 2020/0229010 | A1 * | 7/2020 | Soriaga | H04B 17/318 |
| 2022/0369111 | A1 * | 11/2022 | Xia | H04L 5/0051 |

FOREIGN PATENT DOCUMENTS

WO    WO-2021160434 A1 *   8/2021   ........... G01S 5/0036

OTHER PUBLICATIONS

International Search Report and Written Opinion—PCT/US2022/074452—ISA/EPO—Oct. 21, 2022.

* cited by examiner

*Primary Examiner* — Jinsong Hu
*Assistant Examiner* — Farideh Madani
(74) *Attorney, Agent, or Firm* — QUALCOMM Incorporated

(57) ABSTRACT

In an aspect, a first network node may receive, from a second network node, one or more reference signals transmitted using one or more first polarizations known to the first network node, wherein the one or more reference signals are received having one or more second polarizations. The first network node may determine whether the one or more reference signals followed a line-of-sight (LOS) path between the first network node and the second network node based on a comparison of signal characteristics related to the one or more first polarizations and signal characteristics related to the one or more second polarizations.

13 Claims, 17 Drawing Sheets

POLARIZATION SIGNALING IN LINE-OF-SIGHT PATH DETECTION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of determining a line-of-sight (LOS) condition performed by a first network node includes receiving, from a second network node, one or more reference signals transmitted using one or more first polarizations known to the first network node, wherein the one or more reference signals are received having one or more second polarizations; and determining whether the one or more reference signals followed a LOS path between the first network node and the second network node based on a comparison of signal characteristics related to the one or more first polarizations and signal characteristics related to the one or more second polarizations.

In an aspect, a method of enabling a determination of a line-of-sight (LOS) condition performed by a second network node includes determining one or more first polarizations associated with one or more antenna ports; sending one or more reference signals transmitted on the one or more antenna ports, wherein the one or more reference signals are transmitted on the one or more antenna ports with the one or more first polarizations known to be associated with the one or more antenna ports, and wherein the one or more reference signals are received having one or more second polarizations; and sending one or more polarization indicators indicating the one or more first polarizations and the one or more antenna ports.

In an aspect, a first network node includes a memory; at least one transceiver; and at least one processor communicatively coupled to the memory and the at least one transceiver, the at least one processor configured to: receive, via the at least one transceiver, from a second network node, one or more reference signals transmitted using one or more first polarizations known to the first network node, wherein the one or more reference signals are received having one or more second polarizations; and determine whether the one or more reference signals followed a line-of-sight (LOS) path between the first network node and the second network node based on a comparison of signal characteristics related to the one or more first polarizations and signal characteristics related to the one or more second polarizations.

In an aspect, a second network node includes a memory; at least one transceiver; and at least one processor communicatively coupled to the memory and the at least one transceiver, the at least one processor configured to: determine one or more first polarizations associated with one or more antenna ports; send, via the at least one transceiver, one or more reference signals transmitted on the one or more antenna ports, wherein the one or more reference signals are transmitted on the one or more antenna ports with the one or more first polarizations known to be associated with the one or more antenna ports, and wherein the one or more reference signals are received having one or more second polarizations; and send, via the at least one transceiver, one or more polarization indicators indicating the one or more first polarizations and the one or more antenna ports.

In an aspect, a first network node includes: means for receiving, from a second network node, one or more reference signals transmitted using one or more first polarizations known to the first network node, wherein the one or more reference signals are received having one or more second polarizations; and means for determining whether the one or more reference signals followed a line-of-sight (LOS) path between the first network node and the second network node based on a comparison of signal characteristics related to the one or more first polarizations and signal characteristics related to the one or more second polarizations.

In an aspect, a second network node includes: means for determining one or more first polarizations associated with one or more antenna ports; means for sending one or more reference signals transmitted on the one or more antenna ports, wherein the one or more reference signals are transmitted on the one or more antenna ports with the one or more first polarizations known to be associated with the one or more antenna ports, and wherein the one or more reference signals are received having one or more second polarizations; and means for sending one or more polarization indicators indicating the one or more first polarizations and the one or more antenna ports.

In an aspect, a non-transitory computer-readable medium storing computer-executable instructions that, when executed by a first network node, cause the first network node to: receive, from a second network node, one or more reference signals transmitted using one or more first polarizations known to the first network node, wherein the one or more reference signals are received having one or more second polarizations; and determine whether the one or more reference signals followed a line-of-sight (LOS) path between the first network node and the second network node based on a comparison of signal characteristics related to the one or more first polarizations and signal characteristics related to the one or more second polarizations.

In an aspect, a non-transitory computer-readable medium storing computer-executable instructions that, when executed by a second network node, cause the second network node to: determine one or more first polarizations associated with one or more antenna ports; send, one or more reference signals transmitted on the one or more antenna ports, wherein the one or more reference signals are transmitted on the one or more antenna ports with the one or more first polarizations known to be associated with the one or more antenna ports, and wherein the one or more reference signals are received having one or more second polarizations; and send one or more polarization indicators indicating the one or more first polarizations and the one or more antenna ports.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
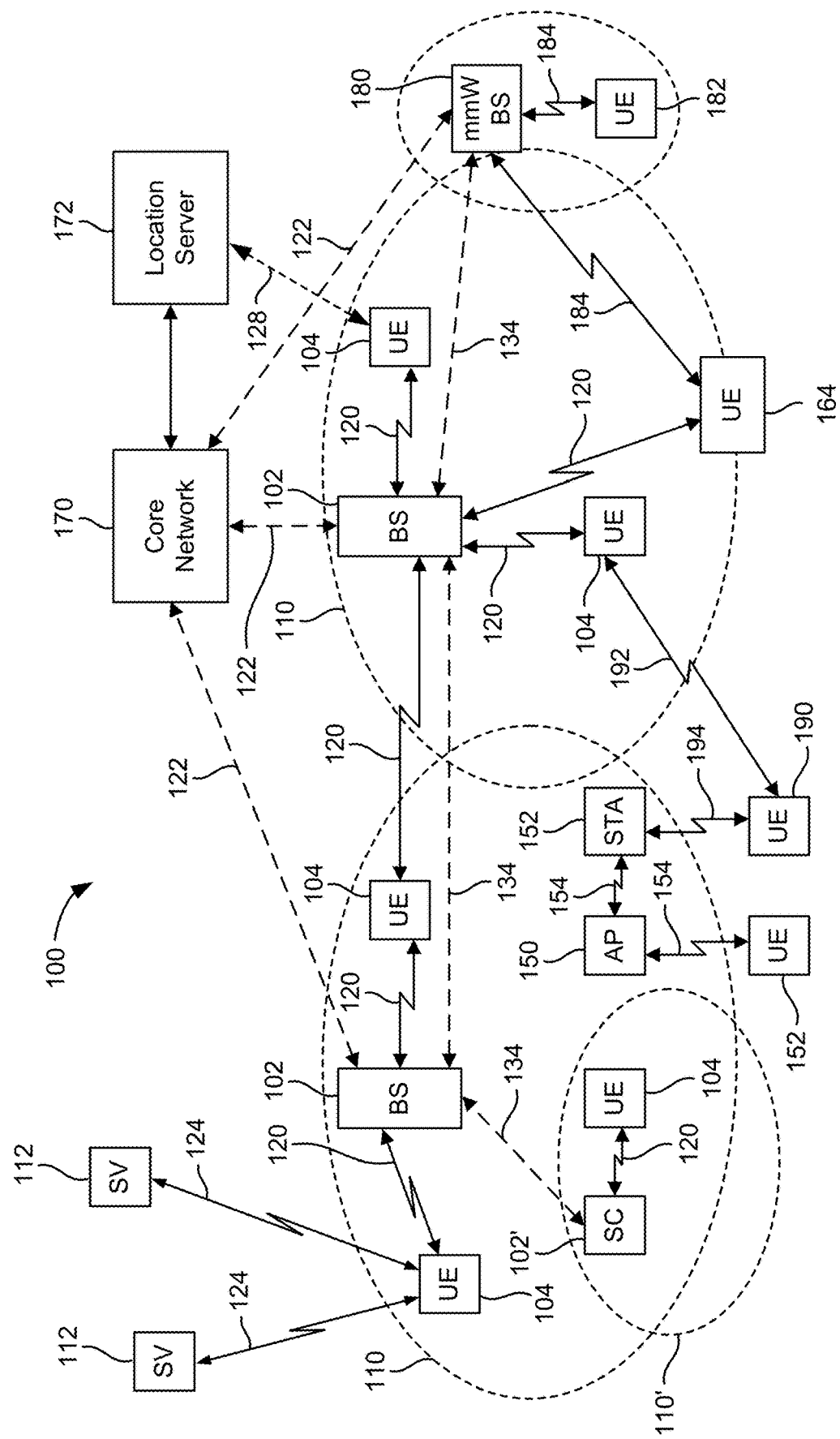
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio-frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely-high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio-frequency band have high path loss and a relatively short-range. The mmW base station 180 and the UE 182 may utilize beamforming (transmit and/or receive) over a mmW communication link 184 to compensate for the extremely high path loss and short-range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal power (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
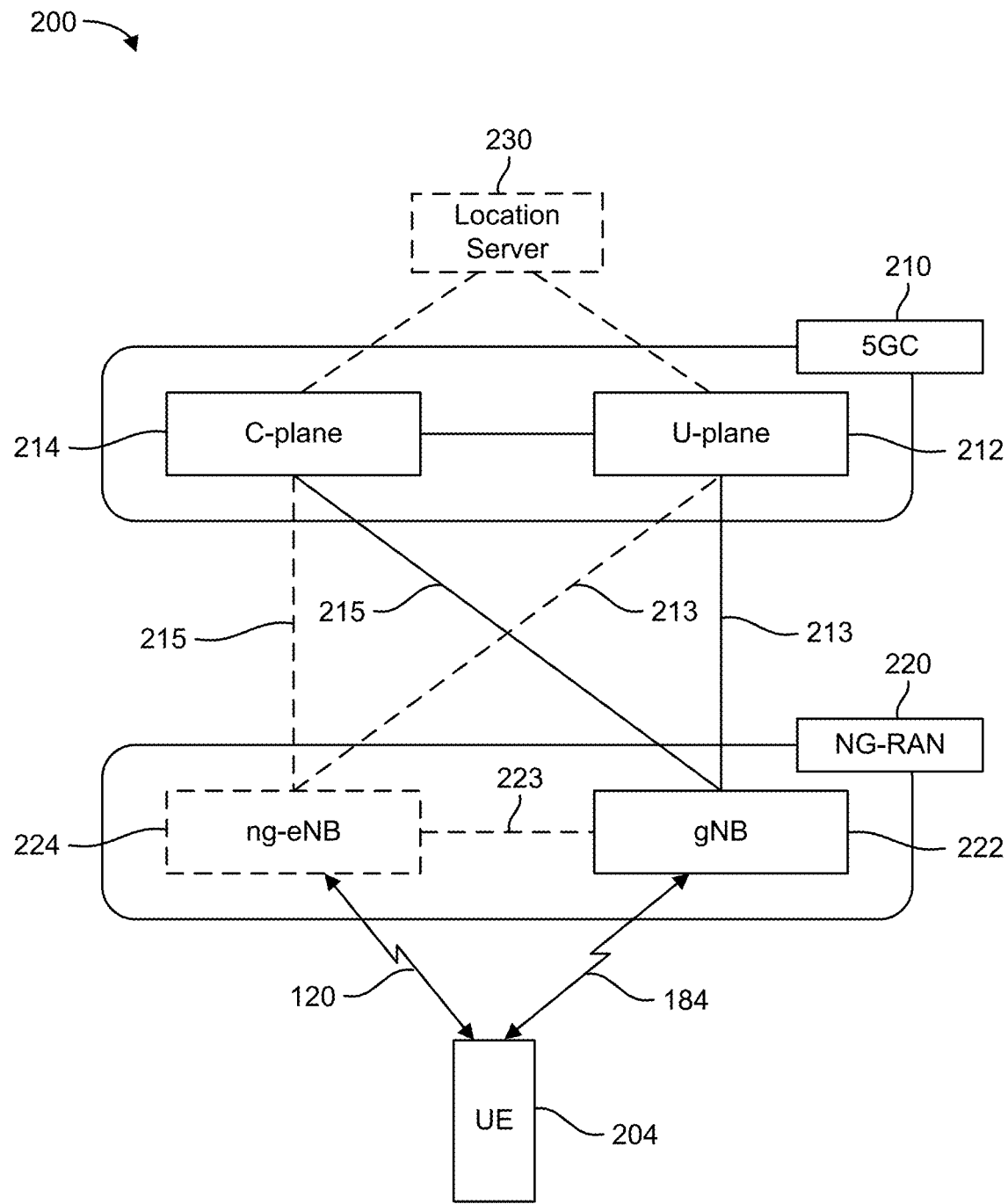
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
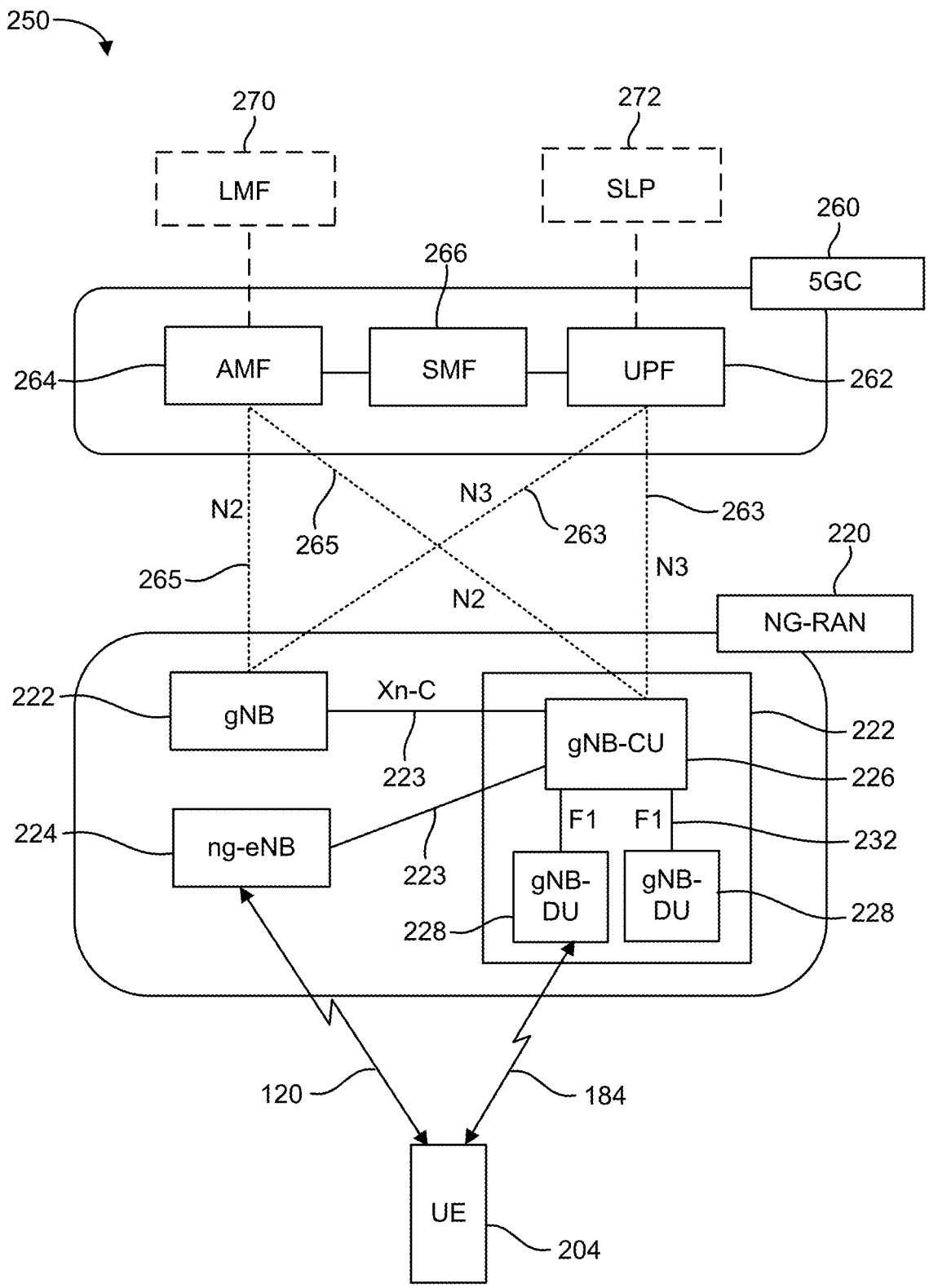

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, RAN sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), Medium Access Control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
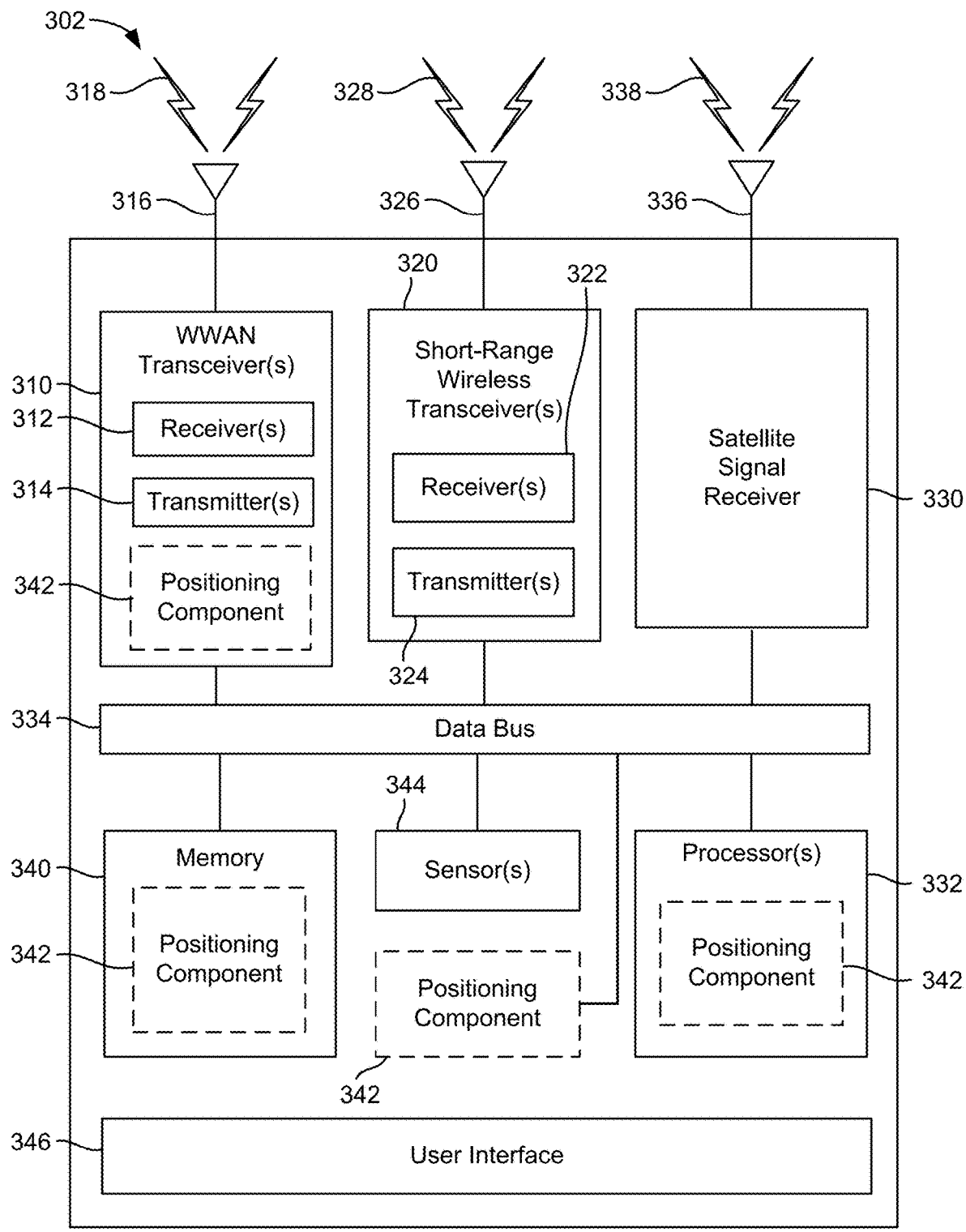
FIGS. 3A, 3B, and 3C are simplified block diagrams of several sample aspects of components that may be employed in a user equipment (UE), a base station, and a network entity, respectively, and configured to support communications as taught herein.
Figure 3B:
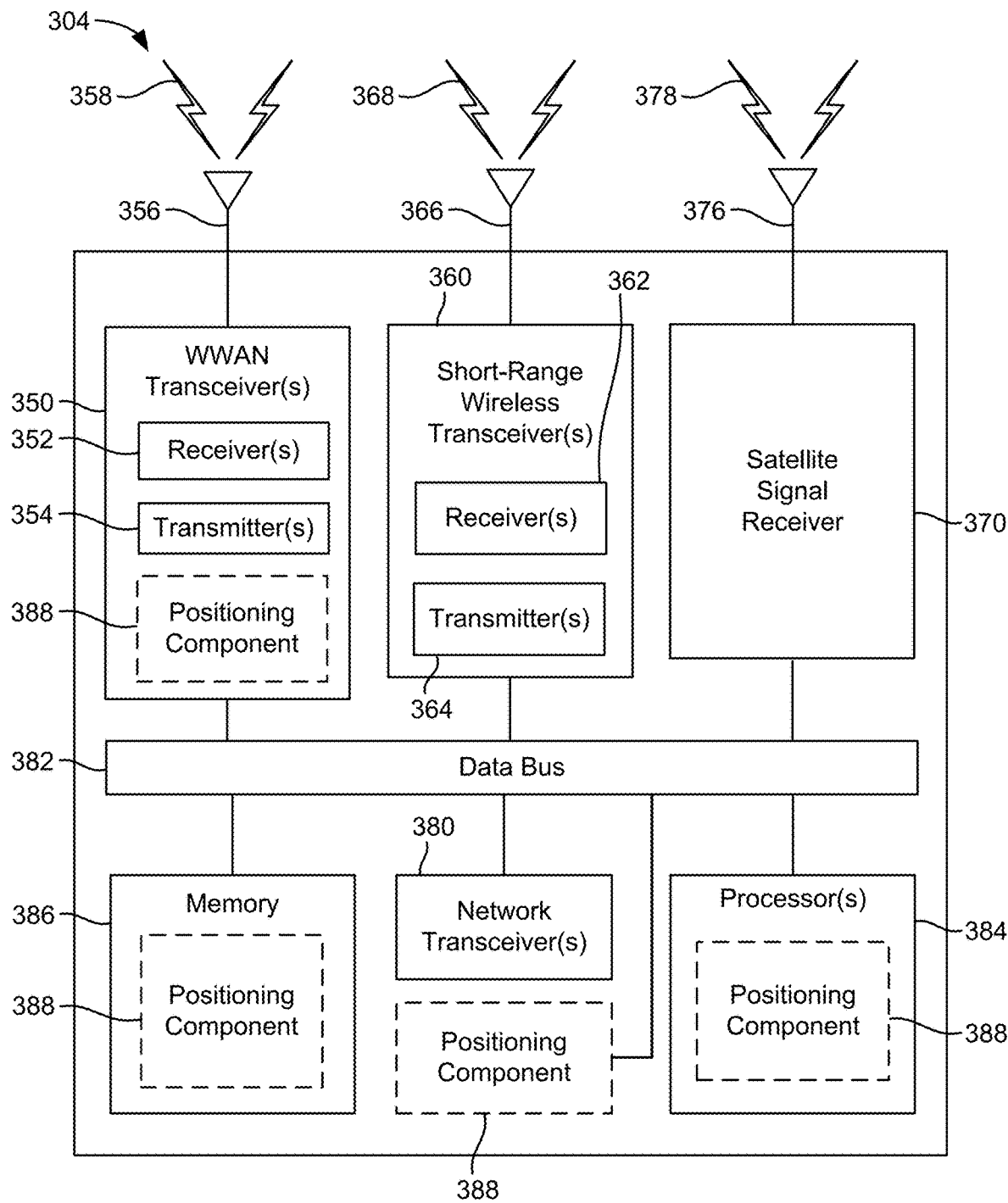
Figure 3C:
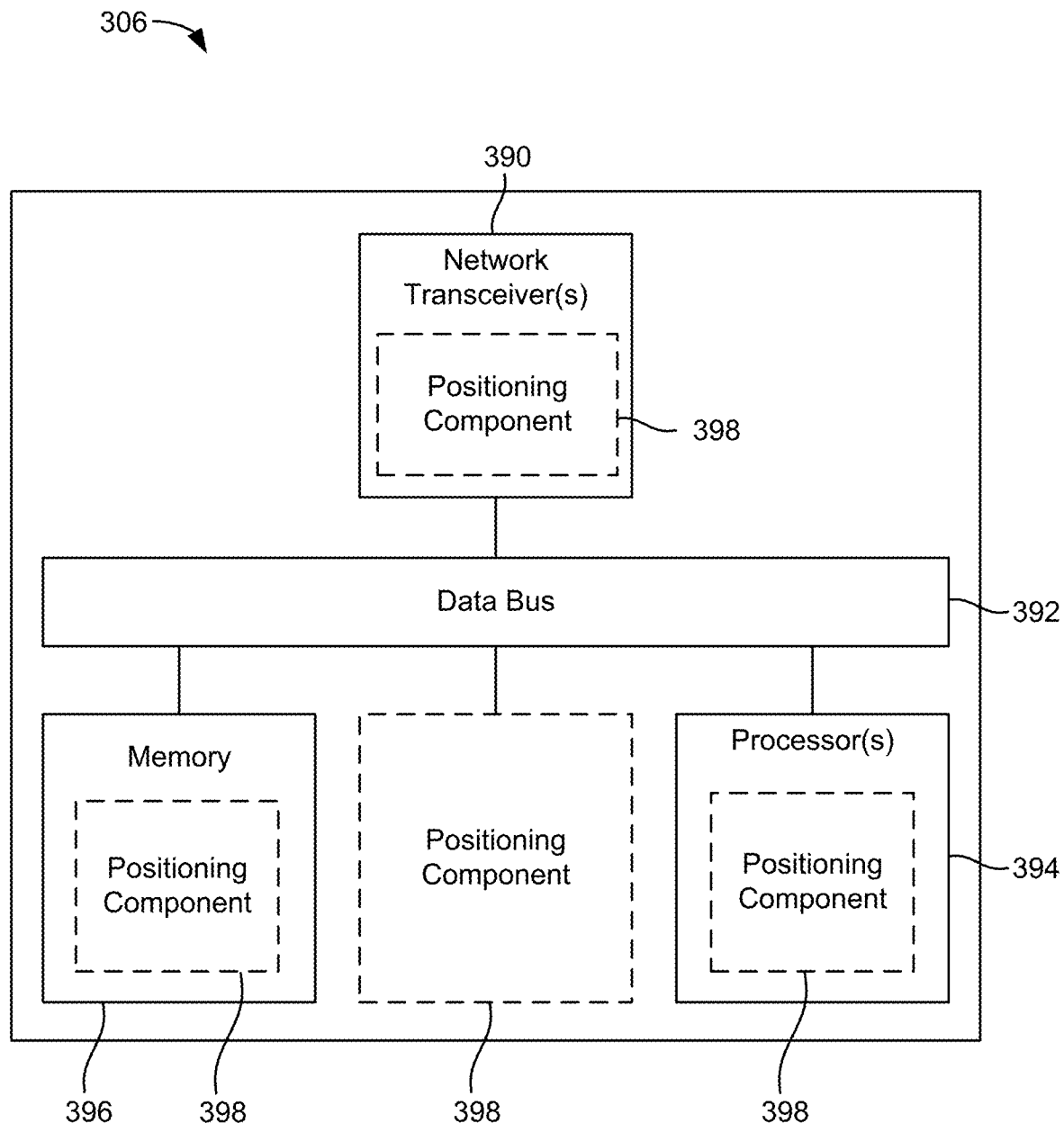

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a Medium Access Control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time-domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have WiFi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a WiFi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG-RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
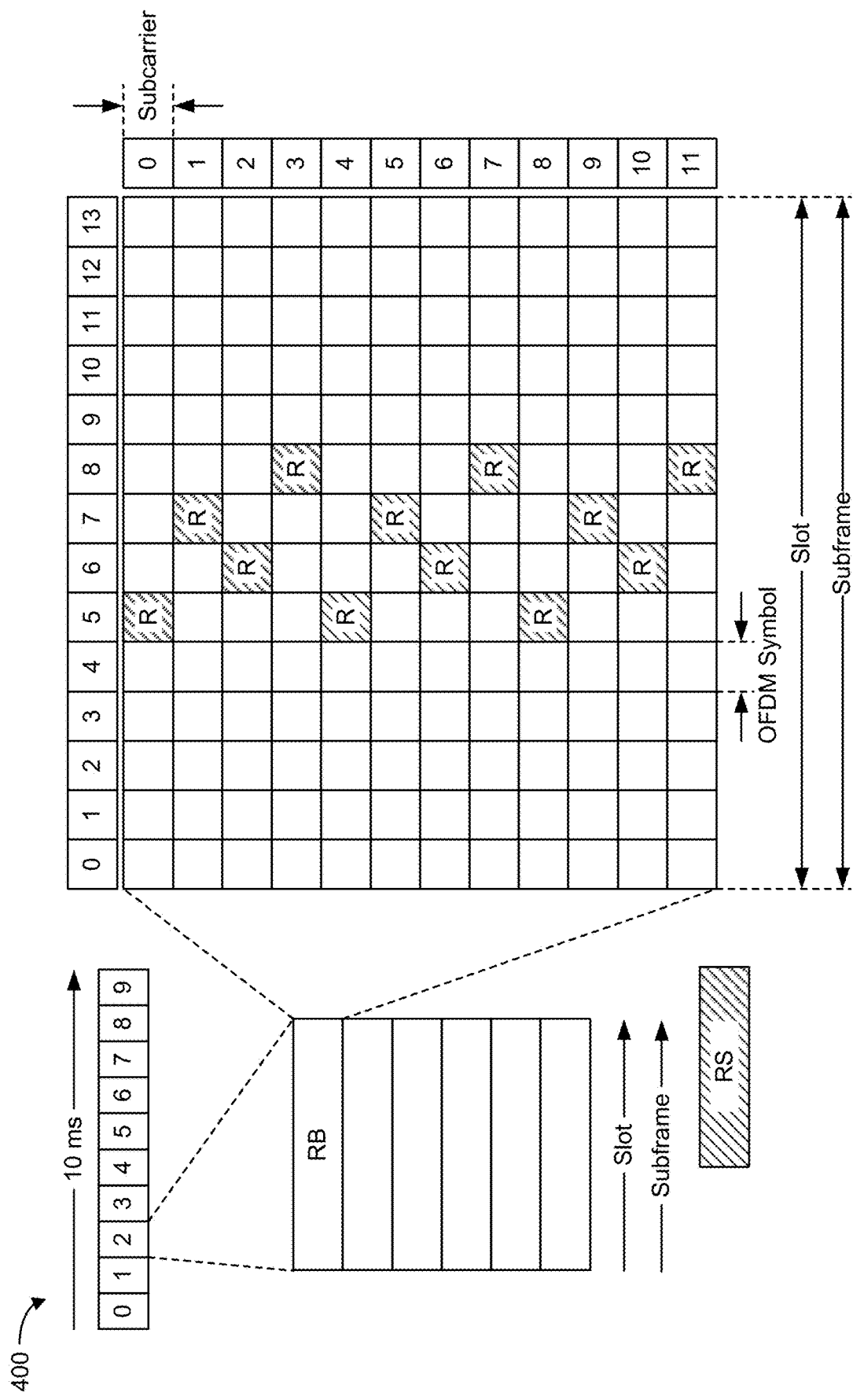
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time-domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time-domain, a 10 ms frame is divided into 10 equally sized subframes of 1 ms each, and each subframe includes one time slot. In FIG. 4, time is represented horizontally (on the x-axis) with time increasing from left to right, while frequency is represented vertically (on the y-axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time-domain and one subcarrier in the frequency domain. In the numerology of FIG. 4, for a normal cyclic prefix, an RB may contain 12 consecutive subcarriers in the frequency domain and seven consecutive symbols in the time-domain, for a total of 84 REs. For an extended cyclic prefix, an RB may contain 12 consecutive subcarriers in the frequency domain and six consecutive symbols in the time-domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of REs can span multiple PRBs in the frequency domain and 'N' (such as 1 or more) consecutive symbol(s) within a slot in the time-domain. In a given OFDM symbol in the time-domain, a PRS resource occupies consecutive PRBs in the frequency domain.

The transmission of a PRS resource within a given PRB has a particular comb-size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
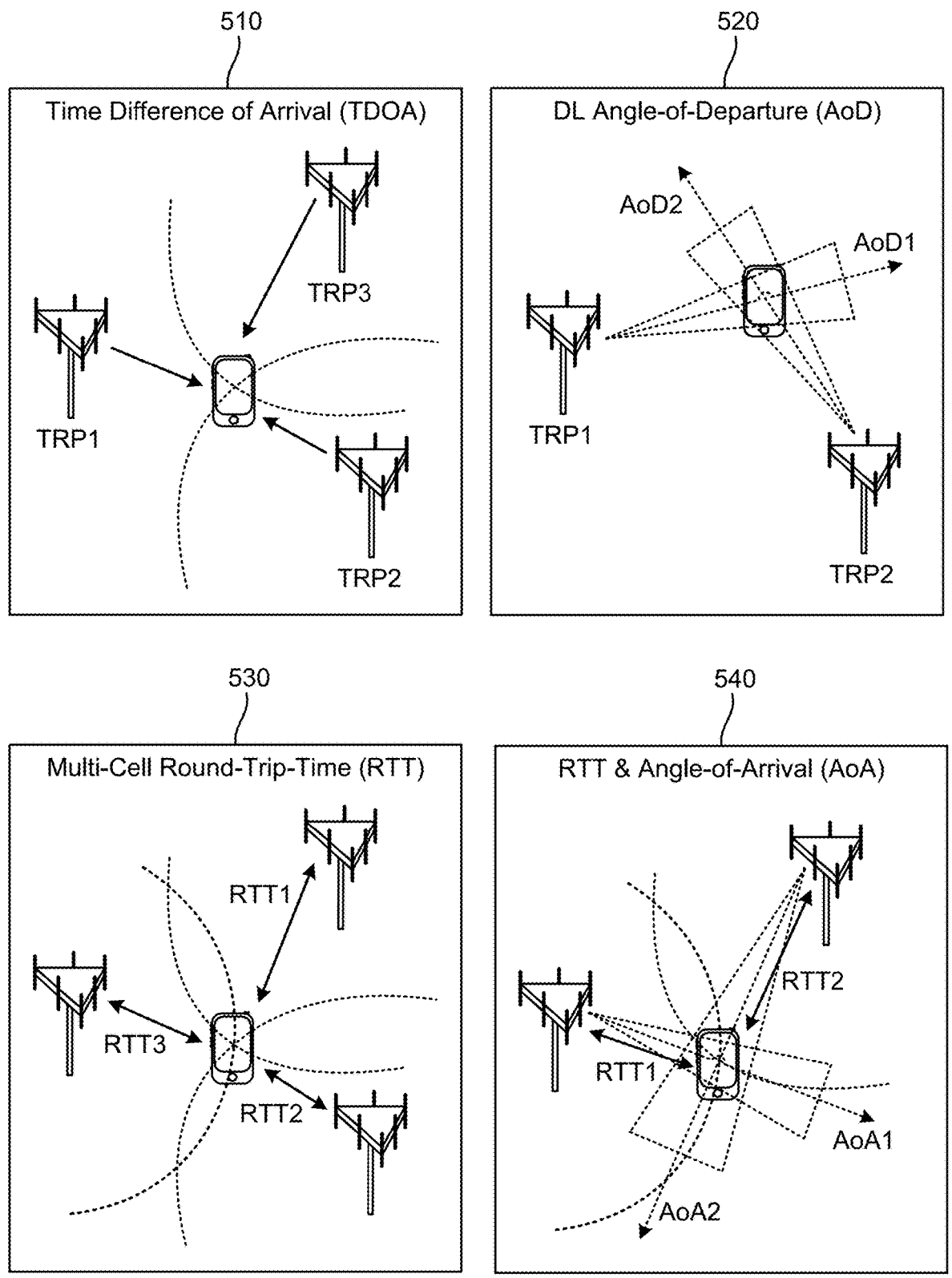
FIG. 5 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 5 illustrates examples of various positioning methods according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a beam report from the UE of received signal strength measurements of multiple downlink transmit beams to determine the angle(s) between the UE and the transmitting base station(s). The positioning entity can then estimate the location of the UE-based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell-ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
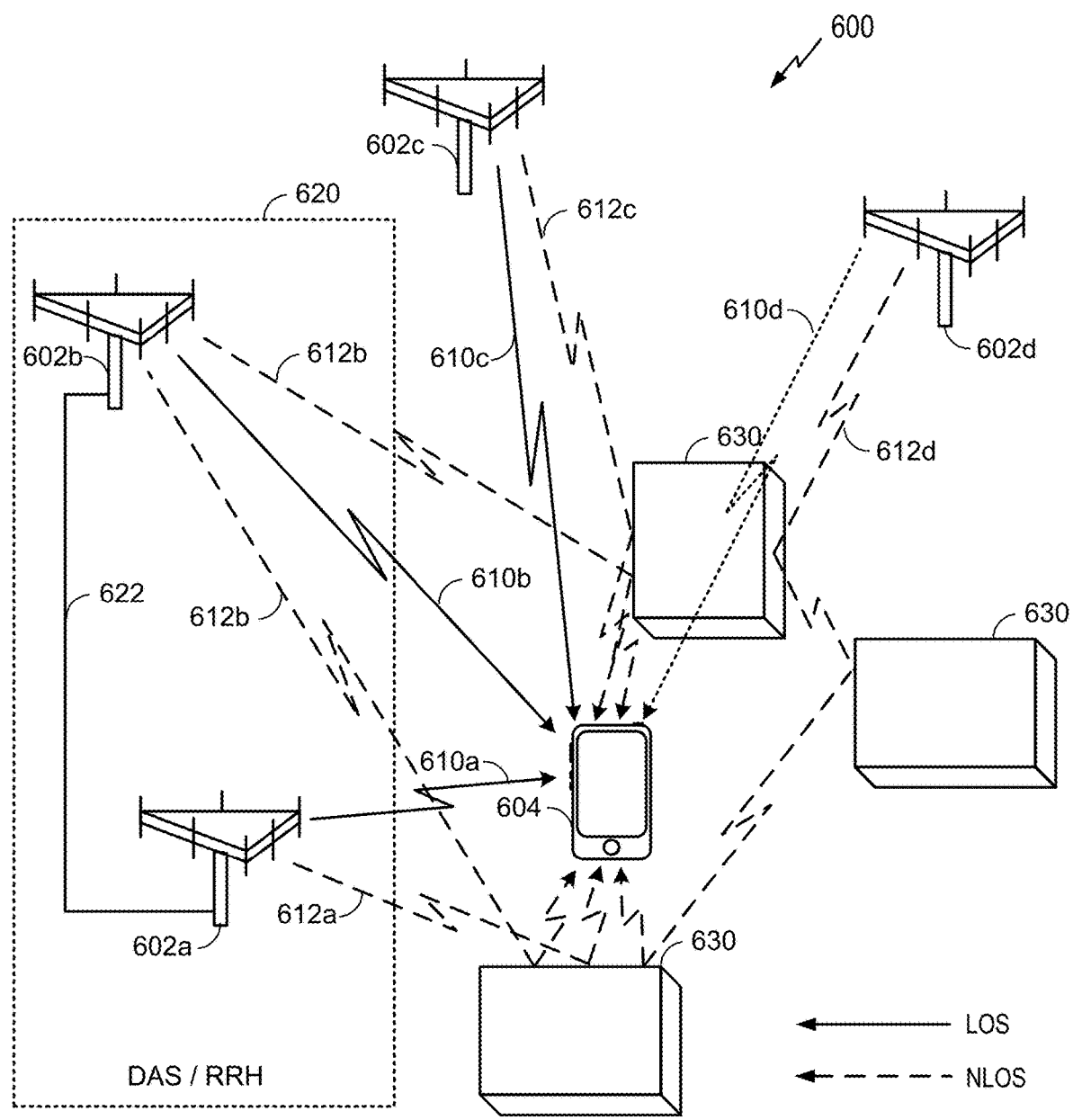
FIG. 6 illustrates an example wireless communications system according to various aspects of the disclosure.

FIG. 6 illustrates an example wireless communications system 600 according to various aspects of the disclosure. In the example of FIG. 6, a UE 604 is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602*a-d* (collectively, base stations 602), which may correspond to, for example, any combination of base stations 102 and 180 and/or WLAN AP 150 in FIG. 1, using RF signals and standardized protocols for the modulation of the RF signals and the exchange of information packets. Note that while FIG. 6 illustrates one UE 604 and four base stations 602, as will be appreciated, there may be more UEs 604 and more or fewer base stations 602.

FIG. 6 further illustrates an aspect in which base stations 602*a* and 602*b* form a DAS/RRH 620. For example, the base station 602*a* may be the serving base station of the UE 604 and the base station 602*b* may be a neighbor base station of the UE 604. As such, the base station 602*b* may be the RRH of the base station 602*a*. The base stations 602*a* and 602*b* may communicate with each other over a wired or wireless link 622.

To support position estimates, the base stations 602 may be configured to broadcast reference RF signals (e.g., positioning reference signals (PRS), tracking reference signals (TRS), cell-specific reference signals (CRS), channel state information reference signals (CSI-RS), demodulation reference signals (DMRS), synchronization signals, etc.) to UEs 604 in their coverage area to enable a UE 604 to measure reference RF signal timing differences (e.g., observed time difference of arrival (OTDOA) or reference signal time difference (RSTD)) between pairs of network nodes and/or to identify the LOS or shortest radio path between the UE 604 and the transmitting base stations 602. Identifying the LOS/shortest path is of interest not only because that path can subsequently be used for OTDOA measurements between a pair of base stations 602, but also because identifying the shortest path can directly provide some positioning information based on the direction of the path. Moreover, identification of the shortest path can be used for other position estimation methods that require precise ToA estimation, such as round-trip-time (RTT)-based methods.

As noted above, 5G supports operation at very high and even EHF bands, such as mmW frequency bands. One of the challenges for wireless communication at very high or extremely-high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz or 5 GHz bands.

Propagation loss is also an issue in MIMO and massive MIMO systems in any band. The term MIMO as used herein generally refers to both MIMO and massive MIMO. MIMO is a method for multiplying the capacity of a radio link by using multiple transmit and receive antennas to exploit multipath propagation. Multipath propagation occurs because RF signals not only travel by the shortest path between the transmitter and receiver, which may be a LOS path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To accurately determine the position of a UE 604 using the RTT procedures described above with reference to FIG. 5, the UE needs to measure the reference RF signals received over the LOS path (or the shortest NLOS path where a LOS path is not available), between the UE 604 and a network node (e.g., a base station 602, an antenna or antenna array of a base station 602). However, as discussed above, RF signals travel not only by the LOS/shortest path between the transmitter and receiver, but also over a number of other paths (multipaths) as the RF signals spread out from the transmitter and reflect off other objects such as hills, buildings, water, and the like on their way to the receiver. Thus, FIG. 6 illustrates a number of LOS paths 610 and a number of NLOS paths 612 between the base stations 602 and the UE 604.

Specifically, FIG. 6 illustrates base station 602a transmitting over a LOS path 610a and an NLOS path 612a, base station 602b transmitting over a LOS path 610b and two NLOS paths 612b, base station 602c transmitting over a LOS path 610c and an NLOS path 612c, and base station 602d transmitting over a LOS path 610d and an NLOS path 612d. As illustrated in FIG. 6, each NLOS path 612 reflects off some object 630 (e.g., a building). As will be appreciated, each LOS path 610 and NLOS path 612 transmitted by a base station 602 may be transmitted by different antennas of the base station 602 (e.g., as in a MIMO system), or may be transmitted by the same antenna of a base station 602 (thereby illustrating the propagation of an RF signal). Further, as used herein, the term "LOS path" or "shortest path" between a transmitter and receiver refers to the straight line path from the transmitter to the receiver. However, such a path may not be an actual LOS path (due to blockages). In that case, the next available path is an NLOS path, which reflects off of some surface(s) when traveling from the transmitter to the receiver.

Electromagnetic waves (RF signals) are transverse waves, meaning that an electromagnetic wave oscillates perpendicular to the direction in which it is traveling. The polarization of an electromagnetic wave specifies the geometrical orientation of the oscillations. For example, an electromagnetic wave may oscillate side to side, up and down, or any direction around the path of travel. Note that an electromagnetic wave consists of an oscillating electric field and magnetic field that are always perpendicular to each other. By convention, the "polarization" of an electromagnetic wave refers to the direction of the electric field.

An important aspect in determining the ToA measurement for the LOS path is separating the measurement of the LOS path from measurements of NLOS paths. The present disclosure provides techniques for using the polarization of a received reference RF signal to determine whether it followed a LOS path or an NLOS path from the transmitter (e.g., a base station) to the receiver (e.g., a UE). More specifically, the present disclosure provides techniques to enable a receiver (e.g., a UE or base station) to determine from a multipath channel estimation which paths correspond to the LOS path (if they can be measured) so that the resulting positioning estimate can be more accurate. For example, if the polarization with which a reference RF signal is transmitted is known, the receiver can compare the polarization of the RF signal when it is received to the expected polarization, and if it is sufficiently different, the receiver can determine that the reference RF signal did not follow a LOS path. However, if the polarization of the RF signal when it is received is the same as the expected polarization, the receiver can determine that the reference RF signal did follow a LOS path. Reference RF signals that did not follow a LOS path can be discarded, while reference RF signals that did follow a LOS path can be used for positioning or other purposes.

Figure 7A:
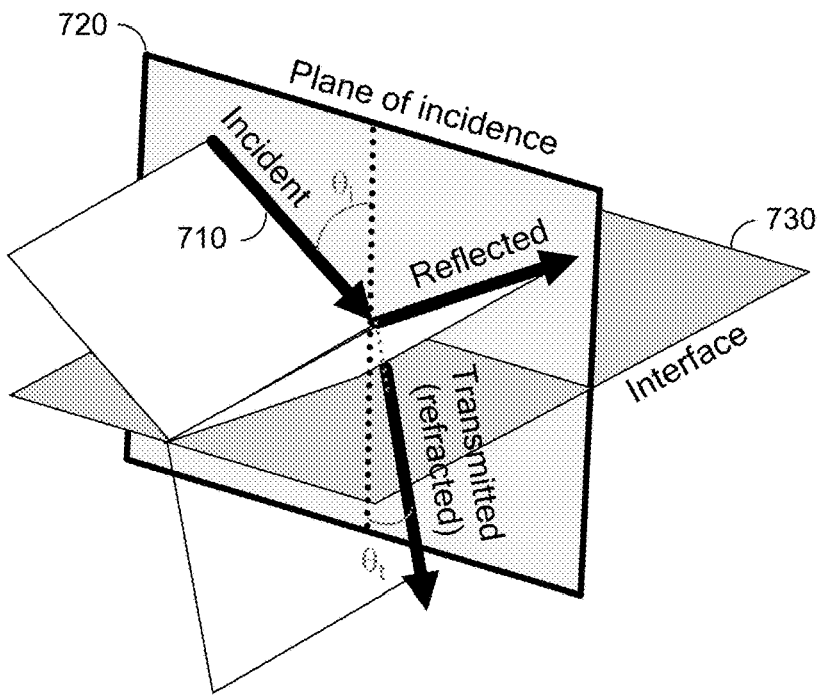
FIG. 7A illustrates various properties of a reference radio frequency (RF) signal transmitted through a medium, according to aspects of the disclosure.

FIG. 7A illustrates various properties of a reference RF signal transmitted through a medium, according to aspects of the disclosure. As shown in FIG. 7A, a reference RF signal is traveling along an incident path 710 in a plane of incidence 720 and impacts an interface 730 (e.g., an obstruction, such as glass, concrete, the ground, etc.). A portion of the reference RF signal is reflected off the interface 730, and a portion is transmitted (refracted) through the interface 730. The angle at which the incident path 710 meets the interface 730 is referred to as the angle of incidence ($\theta_i$), and the angle at which the reference RF signal passes through the interface 730 is referred to as the angle of refraction ($\theta_r$). The angle of reflection is equal to the angle of incidence.

Figure 7B:
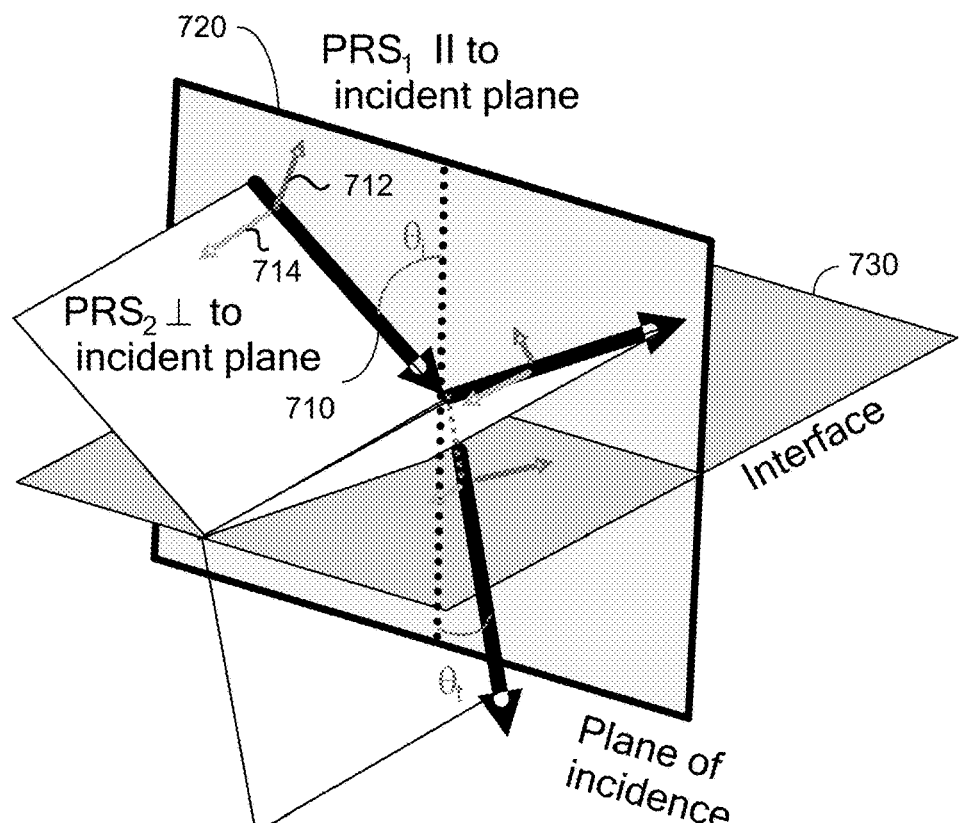
FIG. 7B illustrates how the polarizations for different reference RF signals would be affected by transmission through a medium, according to aspects of the disclosure.

FIG. 7B illustrates how the polarizations for different reference RF signals would be affected by transmission through a medium, according to aspects of the disclosure. In the example of FIG. 7B, a transmitter (e.g., a base station) has transmitted two reference RF signals (referred to as "$PRS_1$" and "$PRS_2$") on two antenna ports along the incident path 710 with perpendicular polarizations, as indicated by reference lines 712 and 714. Specifically, the polarization of the first reference RF signal ($PRS_1$) is parallel to the plane of incidence 720, as indicated by reference line 712, and the polarization of the second reference RF signal ($PRS_2$) is perpendicular to the plane of incidence 720, as indicated by reference line 714. Note that antenna ports do not correspond to physical antennas, but rather, are logical entities distinguished by their reference signal sequences. Thus, multiple antenna port signals can be transmitted on a single transmit antenna, and a single antenna port can be spread across multiple transmit antennas.

After impacting the interface 730, the direction of the polarization of the first reference RF signal ($PRS_1$) and second reference RF signal ($PRS_2$) will have different reflection and transmission coefficients, inducing a change relative to the transmitter. That is, the direction of polarization will have rotated some amount around the incident path 710 upon which the reference RF signals are traveling.

More specifically, if the reflection indexes $n_i$ and $n_r$ are known for the media on the incident and refraction sides, respectively, of the interface 730, the angle of refraction $\theta_r$ for a given angle of incidence $\theta_i$ can be calculated from Snell's Law as:

$n_i \sin \theta_i = n_r \sin \theta_r$

For a given angle of incidence $\theta_i$ and angle of refraction $\theta_r$, the reflection coefficient parallel to the plane of incidence 720 (represented as "$R_\parallel$") can be calculated as:

$$R_\parallel = \frac{\tan^2(\theta_i - \theta_r)}{\tan^2(\theta_i + \theta_r)}$$

The reflection coefficient perpendicular to the plane of incidence 720 (represented as "$R_\perp$") can be calculated as:

$$R_\perp = \frac{\sin^2(\theta_i - \theta_r)}{\sin^2(\theta_i + \theta_r)}$$

$R_\|$ and $R_\perp$ measure the receive power of the reference RF signal parallel and perpendicular, respectively, to the plane of incidence 720. Similar calculations can be repeated for the transmission power, that is, the power of the refracted reference RF signal.

Figure 8:
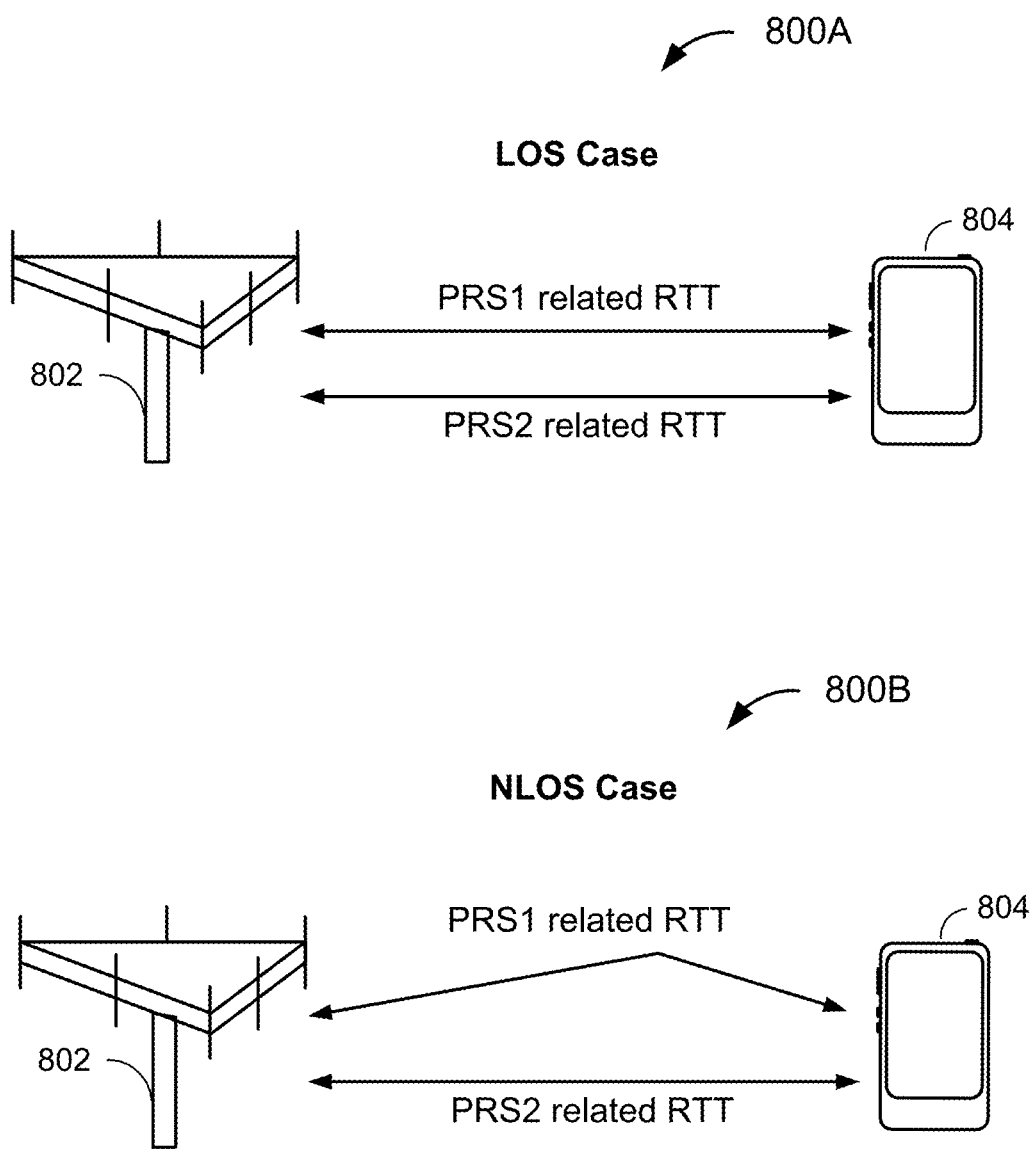
FIG. 8 illustrates an example of differences between line-of-sight (LOS) and non-line-of-sight (NLOS) round-trip-times (RTTs), according to aspects of the disclosure.

FIG. 8 illustrates an example of differences between LOS and NLOS RTTs, according to aspects of the disclosure. Example scenario 800A represents the LOS case, in which the RTT between the transmitter (e.g., a base station 802) and the receiver (e.g., a UE 804) based on a first downlink reference RF signal (e.g., $PRS_1$) and the RTT based on a second downlink reference RF signal ($PRS_2$) are the same, as illustrated by the equal length RTT lines. In contrast, in example scenario 800B, which is an NLOS case, the RTT between the transmitter and the receiver based on a first downlink reference RF signal (e.g., $PRS_1$) is longer than the RTT based on a second downlink reference RF signal ($PRS_2$), indicating that the first reference RF signal RTT followed an NLOS path. In that case, the first reference RF signal RTT would be discarded and the second reference RF signal RTT would be used to determine the position of the receiver.

The receiver's transmission of RTT response reference RF signals per port may have a receiver-selected polarization vector, as opposed to the transmitter's selected polarization of the downlink reference RF signals. The polarization vector may be based on measurements made from the reference RF signal (e.g., $PRS_1$ and $PRS_2$) ports according to specification in the applicable standard, configuration by the network, or autonomously by the receiver. The resulting RTT measurements per reference RF signal (e.g., $PRS_1$ and $PRS_2$) port can help deduce the ToAs for LOS paths and/or reflections.

A determination as to whether a reference signal travels between a transmitting node (e.g., transmitter) and a receiving node (e.g., receiver) along a LOS path as opposed to an NLOS path can be based on various factors, including whether the polarization of the transmitted reference signal has been changed as it traveled along the path. In one aspect, if the polarization of the reference signal received at a receiver is different than the polarization of the reference signal as transmitted on an antenna port of the transmitter, the reference signal has traveled along an NLOS path. However, if the polarization of a reference signal received on the antenna of a receiver is the same as the polarization of the reference signal as transmitted on the antenna port of the transmitter, the receiver may determine that it is likely that the reference signal has traveled along a LOS path.

Figure 9:
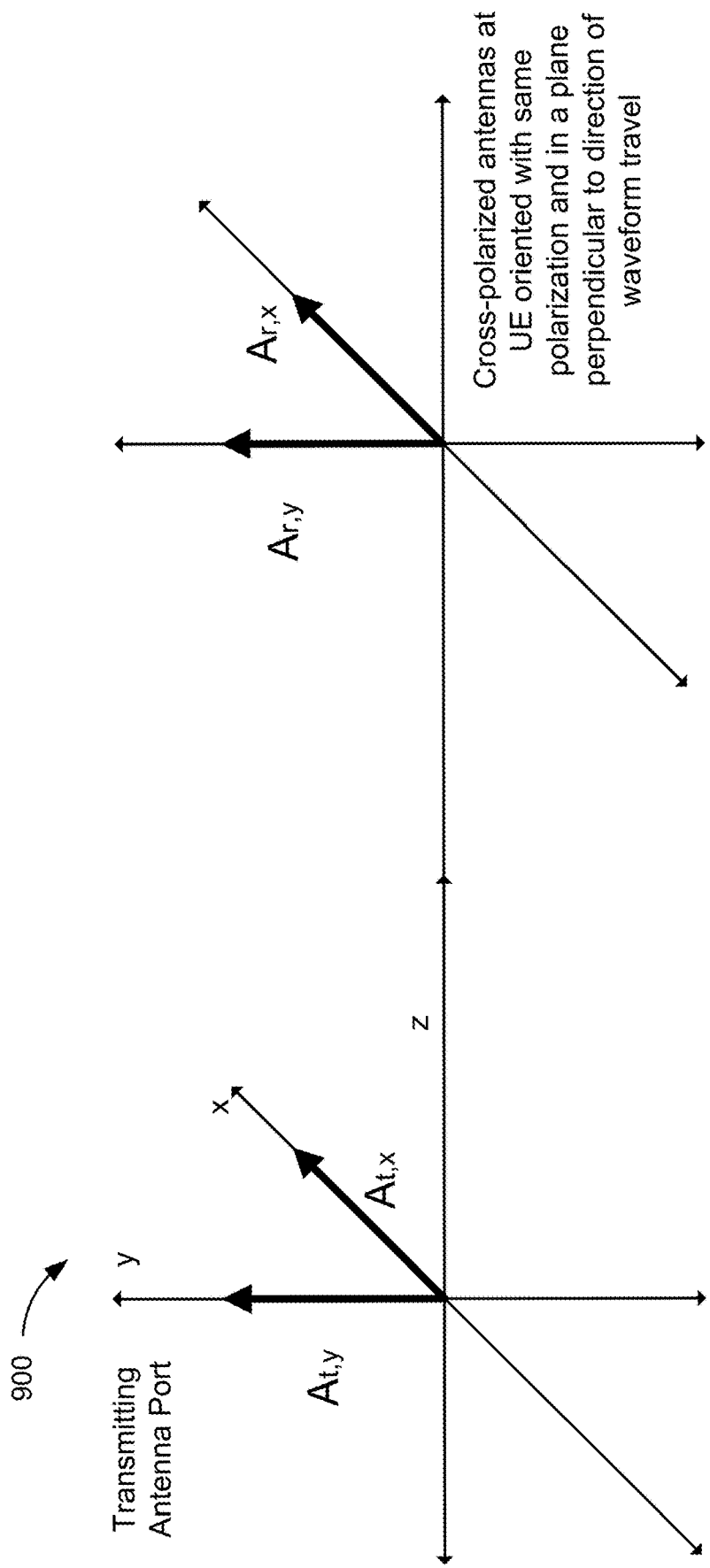
FIG. 9 is a diagram illustrating how the relative power of components of a transmitted reference signal waveform may be used to determine whether the reference signal has traveled along a LOS path.

One manner in which a change in polarization of a reference signal may be detected is through a comparison of the relative signal power of the components of the received signal received. FIG. 9 is a diagram 900 illustrating how the relative power of components of a received reference signal waveform may be used to determine whether the reference signal has traveled along a LOS path. In this example, a reference signal is transmitted on an antenna port of a transmitter and travels in a direction along the z-axis for reception on an antenna of a receiver. The transmitted reference signal in this example has a component $A_{t,y}$ along the y-axis, and another component $A_{t,x}$ along the x-axis, both of equal signal power and orthogonal to one another. The signal is received on the antenna of the receiver in a plane perpendicular to the direction of signal travel (the z-axis). FIG. 9 illustrates an ideal situation in which the polarization of the antenna at the receiver is aligned with the polarization of the transmitting antenna. The reference signal that is received on the antenna of the receiver has a component $A_{r,y}$ along the y-axis, and another component $A_{r,x}$ along the x-axis. If the reference signal has traveled along a LOS path between the antenna port of the transmitter and the antenna of the receiver, the relative power of the components $A_{r,y}$ and $A_{r,x}$ will be substantially equal.

In another example, the transmitted signal may be polarized in a manner in which the components are transmitted at a phase angle other than 90° (e.g., other than orthogonal). Assuming the signal travels along a LOS path, the components of the signal will be received on the antenna port of the receiver with different power having a relationship determinable by the phase angle. If the phase angle is known to the receiver, the receiver may determine whether the signal has traveled along a LOS path.

The foregoing comparison of the relative power of the components of the signal is based on the assumption that the polarization of the transmitting antenna port is aligned with the polarization of the receiving antenna. However, a comparison of the relative power between the components of the waveform becomes complicated if the orientation of the polarization of the transmitting antenna port is different than the orientation of the polarization of the receiving antenna.

In recognition of complications introduced when the orientation of the polarization of the transmitting antenna port is different than the orientation of the polarization of the receiving antenna, certain aspects of the disclosure use circular polarization for transmission of the reference signal when a fixed polarization of a single antenna port is used to transmit the reference signal at the transmitter. As will be appreciated in view of the teachings of the present disclosure, the transmission of a reference signal with circular polarization allows the receiver to use the relative signal power of the components of the received reference signal in determining whether the signal has traveled along a LOS path, even when the antenna port of the receiver has a different polarization orientation than the antenna port transmitting the reference signal.

Figure 10:
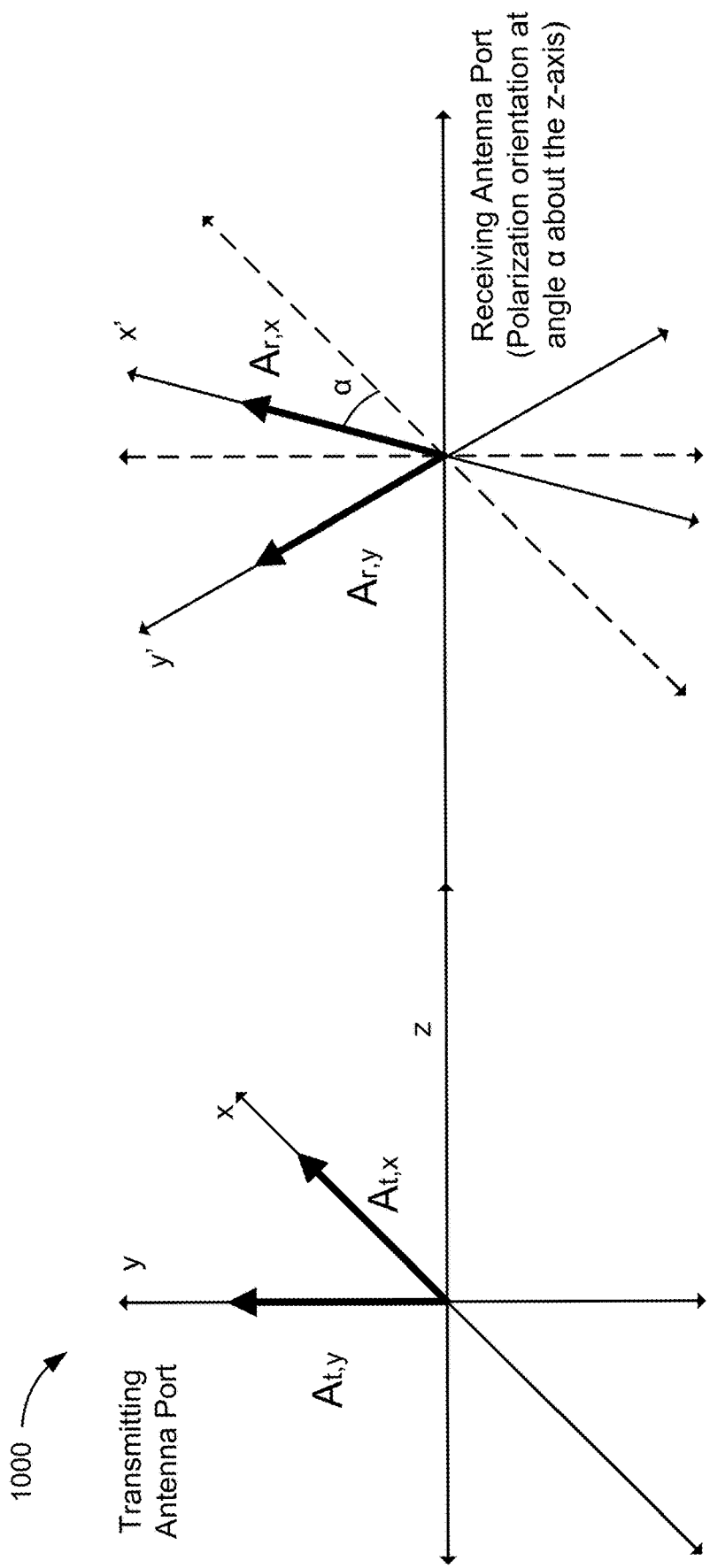
FIG. 10 is a diagram illustrating the reception of a polarized signal by a polarized antenna at a receiver.

FIG. 10 is a diagram 1000 illustrating the reception of a polarized signal by a polarized antenna at a receiver, where the polarization of the antenna port of the receiver has a different orientation than the polarization of the antenna port of the transmitter. In this example, the polarization of the antenna port is rotated at an angle $\alpha$ about the z-axis. The angle $\alpha$, however, is not known to the receiver. As demonstrated herein, the use of a fixed circular polarization for transmission of the reference signal on a single transmitting antenna port allows the receiver to ignore the angle $\alpha$ in determining whether the reference signal is received on a LOS path.

As shown in FIG. 10, the transmitted reference signal has a component $A_{t,y}$ along the y-axis, and another component $A_{t,x}$ along the x-axis, both of equal signal power and orthogonal to one another. The reference signal as received on the antenna port at the receiver has a component $A_{r,y}$ along the y-axis, and another component $A_{r,x}$ along the x-axis. The relationship between the components of the transmitted and received reference signal can be expressed as:

$$\begin{bmatrix} A_{r,x} \\ A_{r,y} \\ 0 \end{bmatrix} \sim \begin{bmatrix} \cos\alpha & \sin\alpha & 0 \\ -\sin\alpha & \cos\alpha & 0 \\ 0 & 0 & 1 \end{bmatrix} \begin{bmatrix} A_{t,x} \\ A_{t,y} \\ 0 \end{bmatrix} = \begin{bmatrix} \cos\alpha A_{t,x} + \sin\alpha A_{t,y} \\ -\sin\alpha A_{t,x} + \cos\alpha A_{t,y} \\ 0 \end{bmatrix}$$

Assuming $|I_{t,y}|=|A_{t,x}|$, then the relationship between $A_{t,x}$ and $A_{t,y}$ may be expressed as $A_{t,y}=A_{t,x}e^{j\theta}$.

For detection of LOS path conditions, the relative power of the components of the transmitted reference signal should be preserved at the receiver so that $|A_{r,x}|=|A_{r,y}|$ when $|A_{t,y}|=|A_{t,x}|$. To obtain this relationship between the relative power of the received components, the condition $|\cos \alpha + \sin \alpha e^{j\theta}|=|-\sin \alpha + \cos \alpha e^{j\theta}|$ should be met. Expanding the equation for this condition results in the following:

$\cos \alpha + \sin \alpha e^{j\theta} - j \sin \alpha \sin \theta | = | -\sin \alpha + \cos \alpha \cos \theta + j \cos \alpha \sin \theta |$ $\sin \alpha \cos \alpha \cos \theta = 0$ $\sin 2\alpha \cos \theta = 0$ If the angle $\alpha$ is to be removed as a variable in the measurement of the components of the received reference signal, then $\cos \theta = 0$ should exist for all $\alpha$ if $|A_{r,x}|=|A_{r,y}|$. This relationship occurs when $$\theta = \pm \frac{\pi}{2}$$

and the angle of $$(A_{r,x}, A_{r,y}) = \theta = \pm \frac{\pi}{2}.$$

As such, certain aspects of the disclosed system use circular polarization (either clockwise or counterclockwise) for transmission of a reference signal, particularly when the reference signal is transmitted by a single antenna port having a fixed polarization.

In accordance with certain aspects of the disclosure, reference signals may be transmitted from antenna ports having time-varying patterns of polarizations. In an aspect, reference signals may be transmitted from one or more antenna ports having a time-varying pattern of orthogonal linear polarizations. In an aspect, reference signals may be transmitted from one or more antenna ports having a time-varying pattern of linear polarizations having known phase offsets. In an aspect, reference signals may be transmitted from one or more antenna ports having a time-varying pattern of horizontal and vertical polarizations. In an aspect, reference signals may be transmitted from one or more antenna ports having a time-varying pattern of orthogonal elliptical polarizations. In an aspect, reference signals may be transmitted from one or more antenna ports having a time-varying pattern of one or more of the foregoing polarizations.

Figure 11A:
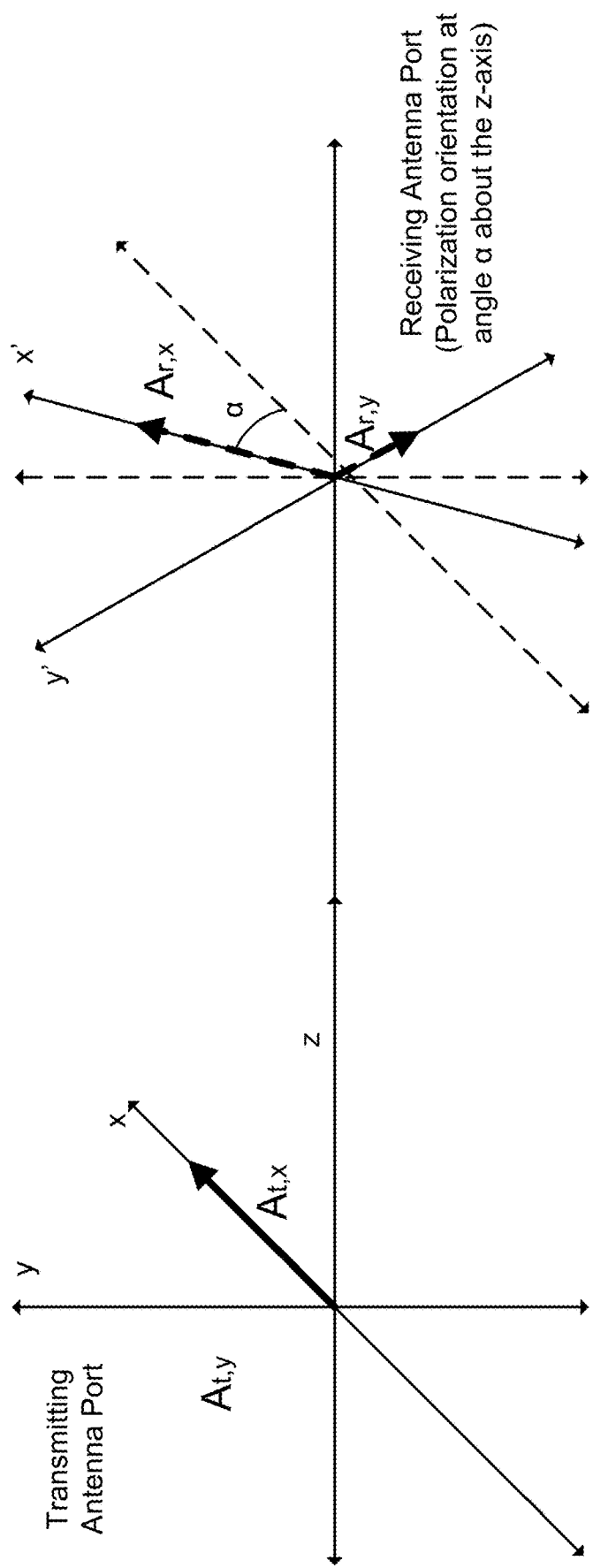
FIG. 11A and FIG. 11B are diagrams illustrating the transmission and reception of reference signals transmitted from an antenna port having a time-varying pattern of polarizations.
Figure 11B:
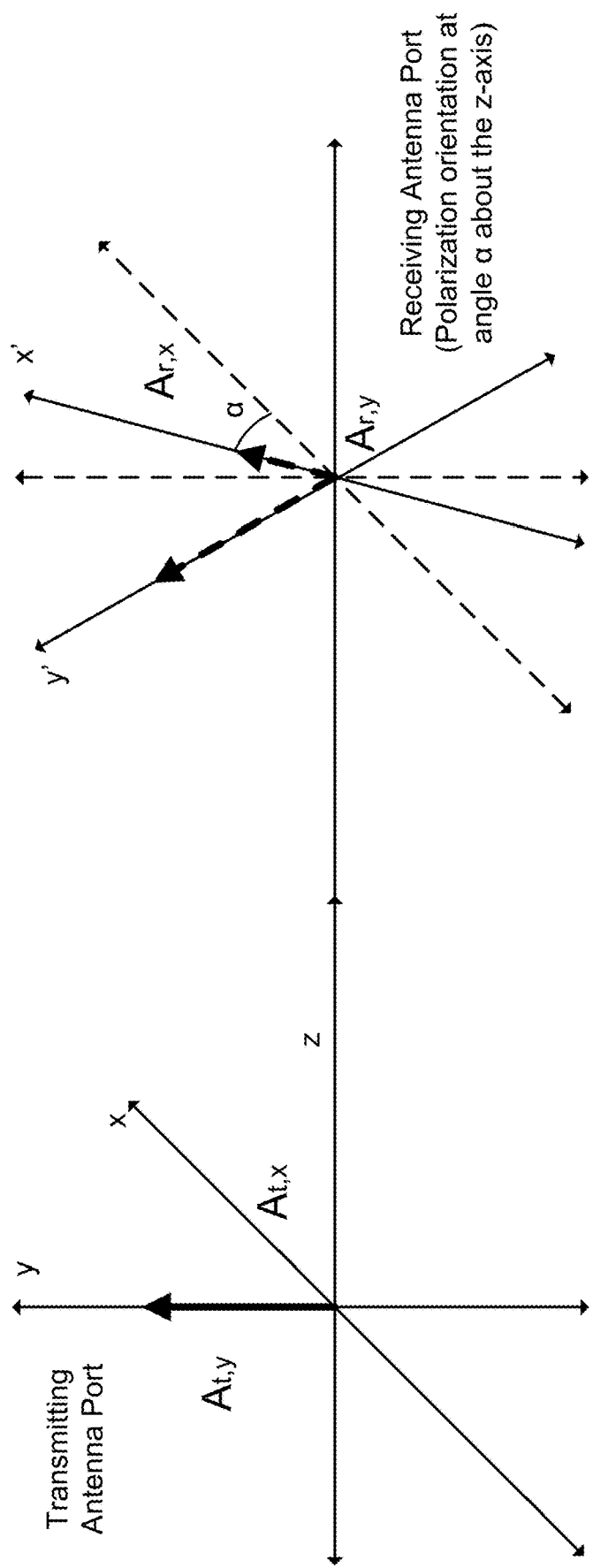

FIG. 11A and FIG. 11B are diagrams illustrating the transmission and reception of reference signals transmitted from an antenna port having a time-varying pattern of polarizations. In this example, the polarizations include one or more transmissions of a reference signal having a time-varying pattern of orthogonal linear polarizations.

FIG. 11A illustrates transmission and reception of a reference signal that only has a signal component $A_{t,x}$ along the x-axis. The reference signal transmission $(A_{t,x}, 0, 0)$ is t, transmitted on an antenna port of the transmitter and received with a rotation a on an antenna of the receiver. The relationship between the transmitted reference signal and the received reference signal in this example is represented by:

$$\begin{bmatrix} A_{r,x} \\ A_{r,y} \\ 0 \end{bmatrix} \sim \begin{bmatrix} \cos\alpha & \sin\alpha & 0 \\ -\sin\alpha & \cos\alpha & 0 \\ 0 & 0 & 1 \end{bmatrix} \begin{bmatrix} A_{t,x} \\ 0 \\ 0 \end{bmatrix} = \begin{bmatrix} \cos\alpha A_{t,x} \\ -\sin\alpha A_{t,x} \\ 0 \end{bmatrix}$$

Using this relationship, the total signal energy received at the antenna of the receiver is proportional to $|\cos \alpha A_{t,x}|^2 + |\sin \alpha A_{t,x}|^2 = |A_{t,x}|^2$.

FIG. 11B shows transmission and reception of a reference signal transmission that only has a component $A_{t,y}$ along the y-axis. The reference signal $(0, A_{t,y}, 0)$ is transmitted on an antenna port of the transmitter and received with a rotation a on an antenna of the receiver. The relationship between the transmitted reference signal and the received reference signal in the example shown in FIG. 11B is represented by:

$$\begin{bmatrix} A_{r,x} \\ A_{r,y} \\ 0 \end{bmatrix} \sim \begin{bmatrix} \cos\alpha & \sin\alpha & 0 \\ -\sin\alpha & \cos\alpha & 0 \\ 0 & 0 & 1 \end{bmatrix} \begin{bmatrix} 0 \\ A_{t,y} \\ 0 \end{bmatrix} = \begin{bmatrix} \sin\alpha A_{t,y} \\ \cos\alpha A_{t,y} \\ 0 \end{bmatrix}$$

Using this relationship, the total signal energy at the antenna of the receiver is proportional to $|\sin \alpha A_{t,y}|^2 + |\cos \alpha A_{t,y}|^2 = |A_{t,y}|^2$.

In an aspect, if the transmitter reference signal alternates between $(A_{t,x}, 0, 0)$ and $(0, A_{t,y}, 0)$ in time and $|A_{t,x}|=|A_{t,y}|$, the total received energy will be the same in the respective time periods if the reference signal has traveled along a LOS path.

Certain aspects of the disclosure may use time-varying patterns of various polarizations for LOS path determination. In an aspect, the pattern may include one or more time-varying patterns of orthogonal linear polarizations, such as shown in FIG. 11A and FIG. 11B. In an aspect, the pattern may include one or more time-varying patterns of clockwise and counterclockwise circular polarizations. In an aspect, the pattern may include one or more time-varying patterns of orthogonal elliptical polarizations. In an aspect, the pattern may included one or more time-varying patterns of linear polarizations having known phase offsets.

In accordance with certain aspects of the disclosure, the polarizations of the antenna ports transmitting the reference signals are known at the receiver. In an aspect, the polarizations of the antenna ports are known to the receiver based on a standard specifying that reference signals from specified antenna ports are only transmitted with a specified polarization. In an aspect, the receiver is provided with one or more indicators indicating the polarizations used by one or more antenna ports to transmit a reference signal. As an example, one or more indicators may be transmitted from one or more TRPs indicating the polarizations of antenna ports used by the TRPs to transmit reference signals. Indicators may be used to indicate a polarization for each antenna port or to indicate a polarization for a group of antenna ports. In the latter case, the one or more polarization indicators comprise a single polarization indicator that is common to all of the antenna ports in the group.

Multiple indicators may be employed to indicate different polarizations of the antenna ports. In an aspect, one or more indicators may be provided to the receiver indicating that one or more antenna ports transmit reference signals using a linear polarization. In an aspect, one or more indicators may be provided to the receiver indicating that one or more antenna ports transmit reference signals using circular polarizations. In an aspect, one or more indicators may be provided to the receiver indicating that one or more antenna ports transmit reference signals using clockwise circular polarizations. In an aspect, one or more indicators may be provided to the receiver indicating that one or more antenna ports transmit reference signals using counterclockwise circular polarizations. In an aspect, one or more indicators may be provided to the receiver indicating that the one or more antenna ports transmit reference signals using elliptical polarizations.

In an aspect, polarization indicators may be communicated to the receiver at various layers of signaling. As an example, the polarization indicators may be communicated through RRC signaling when used, for example, in semi-static polarization configurations. In an aspect, the polarization indicators may be conveyed using lower-layer signaling to allow dynamic configuration changes. As an example, polarization indicators may be conveyed on one or more Control Elements (CE) of a Medium Access Control (MAC) layer, or in Downlink Control Information (DCI) of a Physical Downlink Control Channel (PDCCH).

A broad scope of polarization configurations may be employed. For example, polarizations may be configured on a per beam basis to provide flexibility in the design of the transmitter. Additionally, or in the alternative, polarizations may be configured across multiple beams.

The use of known polarizations (e.g., signaled or hardcoded) has applicability in various system configurations linking multiple devices and systems. Examples of such configurations include gNB to UE (on PRS or other reference signals), UE to gNB (on SRS), between 2 UEs (sidelink), or between 2 gNBs (in a wireless backhaul or IAB situation).

In accordance with certain aspects of the disclosure, systems employing single antenna ports may transmit reference signals using a fixed polarization, such as circular polarization. The fixed polarization may be known to the receiver based on fixed polarizations assigned to antenna ports in a standard, such as the 3GPP standards. In an aspect, the fixed polarization may be known to the receiver based on antenna port polarization indicators provided to the receiver. As an example, a single bit may be used to indicate that circular polarization is used by the antenna port without regard to information on whether the antenna port is using counterclockwise circular polarization or clockwise circular polarization (e.g., a single bit indicates the use or absence of circular polarization). Additionally, or in the alternative, a single bit may be used to indicate whether counterclockwise circular polarization or clockwise circular polarization is used by the antenna port (e.g., based on the assumption that a single bit indicates the use of circular polarization and the state of the bit indicates whether clockwise circular polarization or counterclockwise circular polarization is used. In an aspect, one or more polarizations of the antenna ports at the transmitter are preconfigured by an original equipment manufacturer (OEM).

If multiple polarization configurations of a signal from a single antenna port are allowed over time, the following schemes can enable LOS determination. In an aspect, the multiple configurations may include a pattern with two polarization configurations interlaced in time. The two polarization configurations can be two perpendicular linear polarizations, clockwise and counterclockwise circular polarizations, orthogonal elliptical polarization, etc. In an aspect, the pattern can be made pseudorandom for extra diversity. In an aspect, the pattern could be signaled to the receiver. In an aspect, the exact pattern could be left for transmitter implementation provided that the multiple configurations should change over a certain known period of time such that both polarizations are transmitted with equal amplitudes and for equal amounts of time (e.g., polarization mixing). In an aspect, the receiver can determine LOS by observing the polarization longer than the designated period. The designated period can be hard coded in a standard, such as the 3GPP standard, or signaled to the receiver.

In example systems in which antenna ports use differing polarizations for transmission of the reference signals (e.g., different antenna ports use different polarizations, the same antenna port uses different polarizations at different times, etc.), the polarization may be known to the receiver based on polarizations assigned to antenna ports in the 3GPP standards. Additionally, or in the alternative, multiple bits may be used as indicators indicating one or more types of polarization including, for example, circular polarization, clockwise circular polarization, counterclockwise circular polarization, linear polarization, and elliptical polarization. Additionally, or in the alternative, linear polarizations may be indicated as, for example, a first linear polarization and a second, linear polarization orthogonal to the first linear polarization. Additionally, or in the alternative, linear polarizations may be indicated as, for example, a first linear polarization and a second linear polarization at a known phase angle with respect to the first linear polarization.

In example systems employing time-varying patterns of polarizations, a schedule of a pattern of polarizations for one or more antenna ports may be provided to the receiver. In an aspect, a schedule may include a timed pattern of polarizations that will be used by a given antenna port. In an aspect, a schedule may include a timed pattern of polarizations for a group of antenna ports. In accordance with certain aspects of the disclosure, antenna ports may have a fixed polarization and the schedule provided to the receiver includes only a schedule of the timing of reference signal transmission from the antenna ports without corresponding polarization indicators. In another aspect, if the polarizations of the antenna ports are not fixed then the schedule may include both a time schedule and a schedule of corresponding polarization indicators for the antenna ports or groups of antenna ports. Such schedules may be hardcoded into a 3GPP standard or provided to the receiver using one or more protocol or signaling layers of the 3GPP standards discussed herein.

In accordance with certain aspects of the disclosure, the time-varying pattern of polarizations of the antenna ports may be implemented by the reference signal transmitter. In accordance with certain aspects of the disclosure, the time-varying patterns implemented by the reference signal transmitter are configured to change over a certain known period of time such that reference signals transmitted with multiple polarizations from the same antenna port or group of antenna ports are transmitted with substantially equal amplitudes for substantially equal amounts of time. In accordance with certain aspects of the disclosure, the receiver can determine LOS status by observing the polarization longer than the designated period so that signal measurements are averaged over a sufficiently long time period. The designated period can be hardcoded in the 3GPP standards or signaled to the receiver in a manner as discussed herein.

In accordance with certain aspects of the disclosure, a receiver may determine whether a reference signal has traveled along a LOS path based on a comparison of the signal characteristics of the reference signal as received at the receiver with the signal characteristics related to transmission of the reference signal on an antenna port having a known antenna port polarization. The receiver may determine whether the energy of signals transmitted using, for example, two polarization configurations result in the same total received signal energy. If the signals of the two polarization signals are received with the same energy, the signal has travelled along a LOS path. In an aspect, the total received signal energy may be averaged over the period during which the signal is transmitted with the respective polarization configuration. As an example, the signal energy for a signal transmitted using a first polarization configuration may be averaged over one or more time periods (e.g., single period or multiple periods) during which the signal is transmitted using the first polarization configuration. Similarly, the signal energy for a signal transmitted using a second polarization configuration may be averaged over one or more time periods (e.g., single period or multiple periods) during which the signal is transmitted using the second polarization configuration. In accordance with certain aspects of the disclosure, the total receive signal energy may be determined using the combined signal energy of the reference signal as received at all the received antennas having different polarization directions. In an aspect, a receiver may use angle preservation to determine whether a signal has traveled along a LOS path. If two linear polarizations are used with known phase offset, the phase offset should be preserved if the signal has travelled along an LOS path.

If multiple antenna ports are used for the transmission of reference signals, the multiple antenna ports may use different polarization configurations. In an aspect, each antenna port could have a fixed polarization configuration (e.g., linear, circular, or elliptical). The polarization configurations may be different across antenna ports, and the polarization of each antenna port can vary with time in a pattern, which could be signaled to the receiver using polarization indicators. In an aspect, the exact pattern could be left for transmitter implementation provided the multiple polarization configurations change over a certain known period of time such that signals transmitted using different polarizations are transmitted with equal amplitudes and for equal amounts of time (polarization mixing) over a designated period.

As described herein, the receiver can determine LOS status by observing the polarization longer than the designated period. The designated period can be hard coded in a standard, such as the 3GPP standard, or signaled to the receiver using polarization indicators or a schedule. In one aspect, the schedule would identify times during which a reference signal is sent by each of the antenna ports. In one aspect, the schedule would identify the time pattern and polarization characteristics of the signal transmitted during the time period.

The receiver may use energy preservation as a manner of determining if signals have traveled along a LOS path. In an aspect, if the two polarization configurations result in the same total receive signal energy, the path the signals traveled is a LOS path. The total receive signal energy may be averaged over the period during which the signal is transmitted with the respective polarization configuration. In an aspect, the total receive signal energy may be the combined signal energy of all the received antennas pointing in different directions.

The receiver may also use angle preservation to determine whether signals travel along a LOS path. In an aspect, if two linear polarizations are used with a known phase offset, the phase offset should be preserved at the receiver if the signals have traveled along an LOS path.

Figure 12:
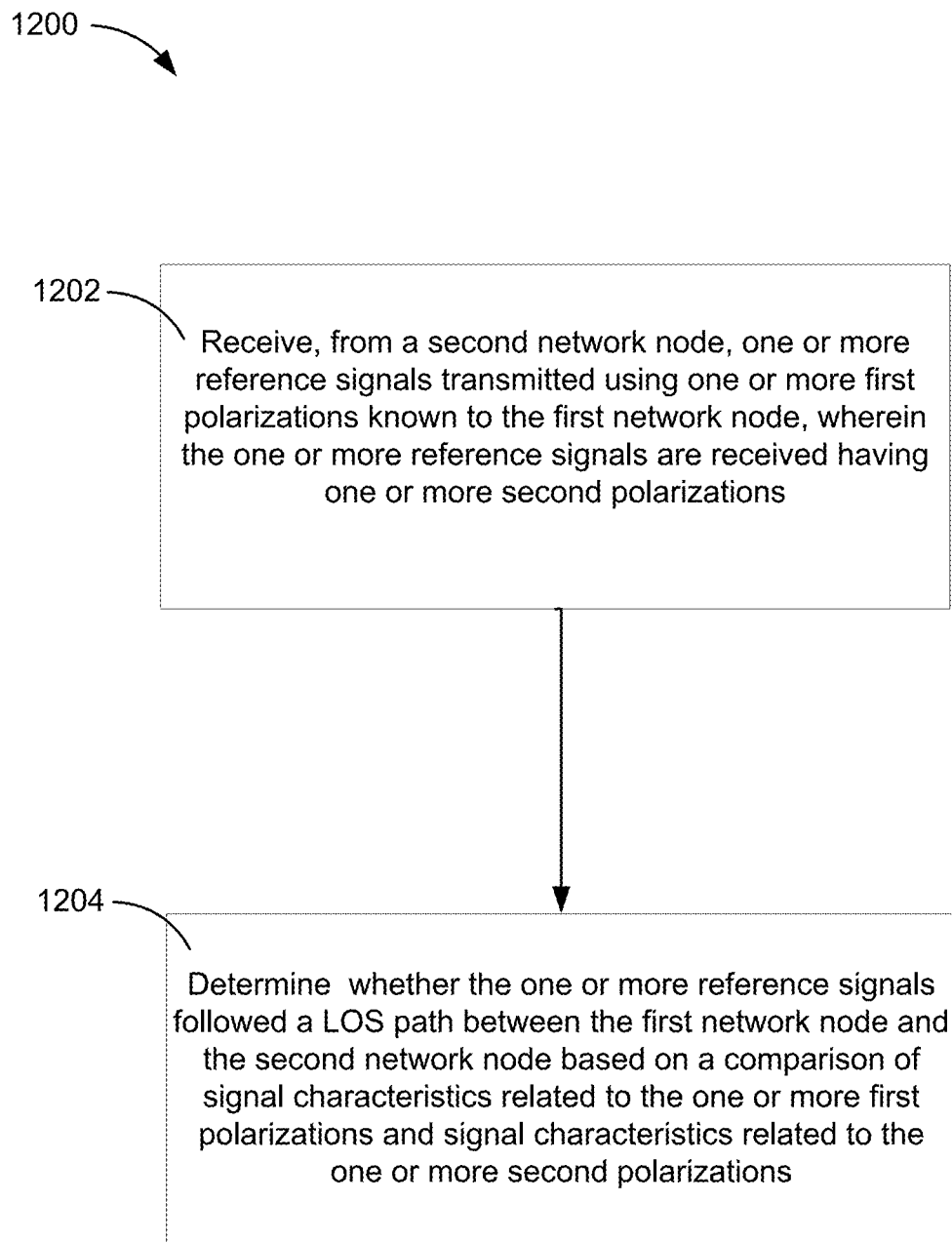
FIG. 12 is a flowchart illustrating example operations of a method of determining a line-of-sight (LOS) condition performed by a first network node.

FIG. 12 is a flowchart 1200 illustrating example operations of a method of determining a LOS condition performed by a second network node. At operation 1202, the first network node receives, from a second network node, one or more reference signals transmitted using one or more first polarizations known to the first network node, wherein the one or more reference signals are received having one or more second polarizations. In an aspect, the first network node may be a UE and the second network node a base station or a second UE. In an aspect, the first network node may be a base station and the second network node a UE. In an aspect, operation 1202 may be performed by the one or more WWAN transceivers 310, the one or more processors 332, memory 340, and/or positioning component 342, any or all of which may be considered means for performing this operation.

At operation 1204, the first network node determines whether the one or more reference signals followed a line-of-sight (LOS path between the first network node and the second network node based on a comparison of signal characteristics related to the one or more first polarizations and signal characteristics related to the one or more second polarizations. In an aspect, operation 1204 may be performed by one or more WWAN transceivers 310, the one or more processors 332, memory 340, and/or positioning component 342, any or all of which may be considered means for performing this operation.

Figure 13:
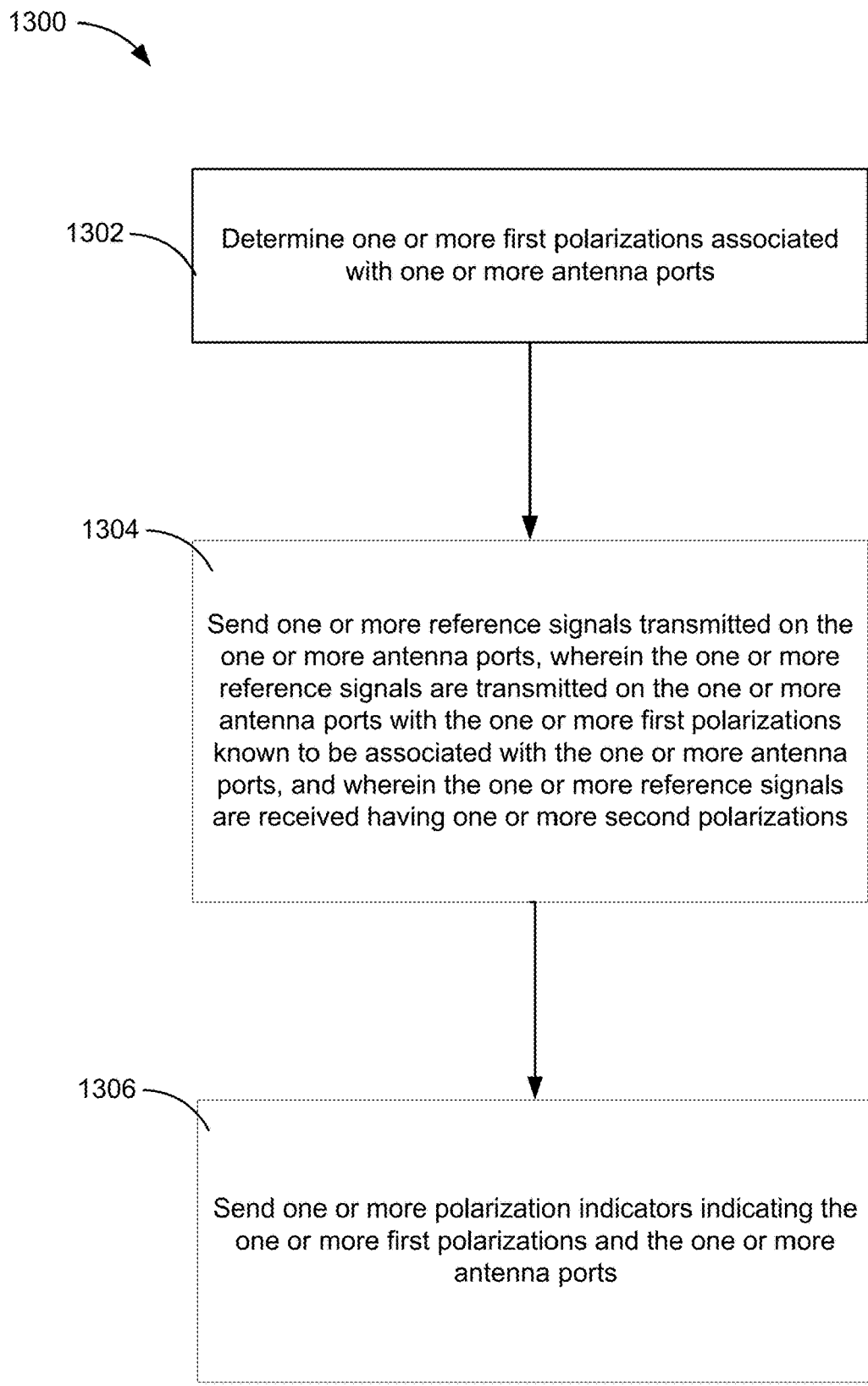
FIG. 13 is a flowchart illustrating example operations of a method of enabling a determination of a line-of-sight (LOS) condition performed by a second network node.

FIG. 13 is a flowchart 1300 illustrating example operations of enabling a determination of a LOS condition performed by a second network node. At operation 1302, the second network node determines one or more first polarizations associated with one or more antenna ports. At operation 1304, the second network node sends one or more reference signals transmitted on the one or more antenna ports, wherein the one or more reference signals are transmitted on the one or more antenna ports with one or more first polarizations known to be associated with the one or more antenna ports, and wherein the one or more reference signals are received having one or more second polarizations. At operation 1306, the second network node sends one or more polarization indicators indicating the one or more first polarizations and the one or more antenna ports.

In an aspect, operations 1302, 1304, and 1306 may be performed by the one or more WWAN transceivers 350, the one or more processors 384, memory 386, and/or positioning component 388, any or all of which may be considered means for performing this operation.

In the detailed description above, it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of determining a line-of-sight (LOS) condition performed by a first network node, comprising: receiving, from a second network node, one or more reference signals transmitted using one or more first polarizations known to the first network node, wherein the one or more reference signals are received having one or more second polarizations; and determining whether the one or more reference signals followed a LOS path between the first network node and the second network node based on a comparison of signal characteristics related to the one or more first polarizations and signal characteristics related to the one or more second polarizations.

Clause 2. The method of clause 1, wherein: the one or more first polarizations known to the first network node include one or more fixed polarizations that are always associated with one or more antenna ports.

Clause 3. The method of clause 2, wherein: the one or more first polarizations known to the first network node are one or more circular polarizations.

Clause 4. The method of clause 1, further comprising: receiving one or more polarization indicators indicating the one or more first polarizations.

Clause 5. The method of clause 4, wherein: the one or more polarization indicators indicate one or more antenna ports associated with the one or more first polarizations.

Clause 6. The method of any of clauses 4 to 5, wherein the one or more polarization indicators are received via: Radio Resource Control (RRC) signaling; one or more Control Elements (CE) of a Medium Access Control (MAC) layer; or Downlink Control Information (DCI) of a Physical Downlink Control Channel (PDCCH).

Clause 7. The method of any of clauses 4 to 6, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counterclockwise circular polarizations; or one or more polarization indicators indicating that the one or more first polarizations are one or more elliptical polarizations.

Clause 8. The method of any of clauses 1 to 7, wherein: the one or more reference signals are transmitted using one or more time-varying patterns of the one or more first polarizations.

Clause 9. The method of clause 8, wherein: one or more of the one or more time-varying patterns is a pseudo-random pattern.

Clause 10. The method of any of clauses 8 to 9, further comprising: receiving one or more polarization indicators indicating the one or more time-varying patterns of the one or more first polarizations.

Clause 11. The method of any of clauses 8 to 10, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 12. The method of any of clauses 8 to 11, wherein: determining whether the one or more reference signals followed the LOS path comprises determining a total received signal energy of the one or more reference signals transmitted using the one or more time-varying patterns of the one or more first polarizations as averaged over one or more periods of the time-varying pattern of the one or more first polarizations.

Clause 13. The method of any of clauses 8 to 12, wherein: the one or more time-varying patterns of the one or more first polarizations includes one or more time-varying patterns of linear polarizations, wherein the time-varying patterns of the linear polarizations are transmitted with one or more known phase offsets; and determining whether the one or more reference signals followed the LOS path comprises determining whether the one or more known phase offsets are preserved when the one or more reference signals are received at the first network node.

Clause 14. A method of determining a line-of-sight (LOS) condition performed by a second network node, comprising: determining one or more first polarizations associated with one or more antenna ports; sending one or more reference signals transmitted on the one or more antenna ports, wherein the one or more reference signals are transmitted on the one or more antenna ports with the one or more first polarizations known to be associated with the one or more antenna ports, and wherein the one or more reference signals are received having one or more second polarizations; and sending one or more polarization indicators indicating the one or more first polarizations and the one or more antenna ports.

Clause 15. The method of clause 14, wherein the one or more polarization indicators are sent via: Radio Resource Control (RRC) signaling; one or more Control Elements (CE) of a Medium Access Control (MAC) layer; or Downlink Control Information (DCI) of a Physical Downlink Control Channel (PDCCH).

Clause 16. The method of any of clauses 14 to 15, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counterclockwise circular polarizations; or one or more polarization indicators indicating that the one or more first polarizations are one or more elliptical polarizations.

Clause 17. The method of any of clauses 14 to 16, wherein: the one or more reference signals are transmitted using one or more time-varying patterns of the one or more first polarizations.

Clause 18. The method of clause 17, further comprising: sending one or more polarization indicators indicating the one or more time-varying patterns of the one or more first polarizations.

Clause 19. The method of any of clauses 17 to 18, wherein: one or more of the one or more time-varying patterns is a pseudo-random pattern.

Clause 20. The method of any of clauses 17 to 19, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 21. The method of any of clauses 17 to 20, wherein: the one or more time-varying patterns of the one or more first polarizations includes one or more time-varying patterns of linear polarizations, wherein the time-varying patterns of the linear polarizations are transmitted with one or more known phase offsets.

Clause 22. A first network node, comprising: a memory; at least one transceiver; and at least one processor communicatively coupled to the memory and the at least one transceiver, the at least one processor configured to: receive, via the at least one transceiver, from a second network node, one or more reference signals transmitted using one or more first polarizations known to the first network node, wherein the one or more reference signals are received having one or more second polarizations; and determine whether the one or more reference signals followed a line-of-sight (LOS) path between the first network node and the second network node based on a comparison of signal characteristics related to the one or more first polarizations and signal characteristics related to the one or more second polarizations.

Clause 23. The first network node of clause 22, wherein: the one or more first polarizations known to the first network node include one or more fixed polarizations that are always associated with one or more antenna ports.

Clause 24. The first network node of clause 23, wherein: the one or more first polarizations known to the first network node are one or more circular polarizations.

Clause 25. The first network node of clause 22, wherein the at least one processor is further configured to: receive, via the at least one transceiver, one or more polarization indicators indicating the one or more first polarizations.

Clause 26. The first network node of clause 25, wherein: the one or more polarization indicators indicate one or more antenna ports associated with the one or more first polarizations.

Clause 27. The first network node of any of clauses 25 to 26, wherein the one or more polarization indicators are received via: Radio Resource Control (RRC) signaling; one or more Control Elements (CE) of a Medium Access Control (MAC) layer; or Downlink Control Information (DCI) of a Physical Downlink Control Channel (PDCCH).

Clause 28. The first network node of clause 22, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counterclockwise circular polarizations; or one or more polarization indicators indicating that the one or more first polarizations are one or more elliptical polarizations.

Clause 29. The first network node of any of clauses 22 to 28, wherein: the one or more reference signals are transmitted using one or more time-varying patterns of the one or more first polarizations.

Clause 30. The first network node of clause 29, wherein: one or more of the one or more time-varying patterns is a pseudo-random pattern.

Clause 31. The first network node of clause 29, wherein the at least one processor is further configured to: receive, via the at least one transceiver, one or more polarization indicators indicating the one or more time-varying patterns of the one or more first polarizations.

Clause 32. The first network node of any of clauses 29 to 31, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 33. The first network node of any of clauses 29 to 32, wherein: determining whether the one or more reference signals followed the LOS path comprises determining a total received signal energy of the one or more reference signals transmitted using the one or more time-varying patterns of the one or more first polarizations as averaged over one or more periods of the time-varying pattern of the one or more first polarizations.

Clause 34. The first network node of any of clauses 29 to 33, wherein: the one or more time-varying patterns of the one or more first polarizations includes one or more time-varying patterns of linear polarizations, wherein the time-varying patterns of the linear polarizations are transmitted with one or more known phase offsets; and determining whether the one or more reference signals followed the LOS path comprises determining whether the one or more known phase offsets are preserved when the one or more reference signals are received at the first network node.

Clause 35. A second network node, comprising: a memory; at least one transceiver; and at least one processor communicatively coupled to the memory and the at least one transceiver, the at least one processor configured to: determine one or more first polarizations associated with one or more antenna ports; send, via the at least one transceiver, one or more reference signals transmitted on the one or more antenna ports, wherein the one or more reference signals are transmitted on the one or more antenna ports with the one or more first polarizations known to be associated with the one or more antenna ports, and wherein the one or more reference signals are received having one or more second polarizations; and send, via the at least one transceiver, one or more polarization indicators indicating the one or more first polarizations and the one or more antenna ports.

Clause 36. The second network node of clause 35, wherein the one or more polarization indicators are sent via: Radio Resource Control (RRC) signaling; one or more Control Elements (CE) of a Medium Access Control (MAC) layer; or Downlink Control Information (DCI) of a Physical Downlink Control Channel (PDCCH).

Clause 37. The second network node of any of clauses 35 to 36, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counterclockwise circular polarizations; or one or more polarization indicators indicating that the one or more first polarizations are one or more elliptical polarizations.

Clause 38. The second network node of any of clauses 35 to 37, wherein: the one or more reference signals are transmitted using one or more time-varying patterns of the one or more first polarizations.

Clause 39. The second network node of clause 38, wherein the at least one processor is further configured to: send, via the at least one transceiver, one or more polarization indicators indicating the one or more time-varying patterns of the one or more first polarizations.

Clause 40. The second network node of any of clauses 38 to 39, wherein: one or more of the one or more time-varying patterns is a pseudo-random pattern.

Clause 41. The second network node of any of clauses 38 to 40, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 42. The second network node of any of clauses 38 to 41, wherein: the one or more time-varying patterns of the one or more first polarizations includes one or more time-varying patterns of linear polarizations, wherein the time-varying patterns of the linear polarizations are transmitted with one or more known phase offsets.

Clause 43. A first network node, comprising: means for receiving, from a second network node, one or more reference signals transmitted using one or more first polarizations known to the first network node, wherein the one or more reference signals are received having one or more second polarizations; and means for determining whether the one or more reference signals followed a line-of-sight (LOS) path between the first network node and the second network node based on a comparison of signal characteristics related to the one or more first polarizations and signal characteristics related to the one or more second polarizations.

Clause 44. The first network node of clause 43, wherein: the one or more first polarizations known to the first network node include one or more fixed polarizations that are always associated with one or more antenna ports.

Clause 45. The first network node of clause 44, wherein: the one or more first polarizations known to the first network node are one or more circular polarizations.

Clause 46. The first network node of clause 43, further comprising: means for receiving one or more polarization indicators indicating the one or more first polarizations.

Clause 47. The first network node of clause 46, wherein: the one or more polarization indicators indicate one or more antenna ports associated with the one or more first polarizations.

Clause 48. The first network node of any of clauses 46 to 47, wherein the one or more polarization indicators are received via: Radio Resource Control (RRC) signaling; one or more Control Elements (CE) of a Medium Access Control (MAC) layer; or Downlink Control Information (DCI) of a Physical Downlink Control Channel (PDCCH).

Clause 49. The first network node of any of clauses 43 to 48, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counterclockwise circular polarizations; or one or more polarization indicators indicating that the one or more first polarizations are one or more elliptical polarizations.

Clause 50. The first network node of any of clauses 43 to 49, wherein: the one or more reference signals are transmitted using one or more time-varying patterns of the one or more first polarizations.

Clause 51. The first network node of clause 50, wherein: one or more of the one or more time-varying patterns is a pseudo-random pattern.

Clause 52. The first network node of any of clauses 50 to 51, further comprising: means for receiving one or more polarization indicators indicating the one or more time-varying patterns of the one or more first polarizations.

Clause 53. The first network node of any of clauses 50 to 52, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 54. The first network node of any of clauses 50 to 53, wherein: means for determining whether the one or more reference signals followed the LOS path comprises determining a total received signal energy of the one or more reference signals transmitted using the one or more time-varying patterns of the one or more first polarizations as averaged over one or more periods of the time-varying pattern of the one or more first polarizations.

Clause 55. The first network node of any of clauses 50 to 54, wherein: the one or more time-varying patterns of the one or more first polarizations includes one or more time-varying patterns of linear polarizations, wherein the time-varying patterns of the linear polarizations are transmitted with one or more known phase offsets; and determining whether the one or more reference signals followed the LOS path comprises determining whether the one or more known phase offsets are preserved when the one or more reference signals are received at the first network node.

Clause 56. A second network node, comprising: means for determining one or more first polarizations associated with one or more antenna ports; means for sending one or more reference signals transmitted on the one or more antenna ports, wherein the one or more reference signals are transmitted on the one or more antenna ports with one or more first polarizations known to be associated with the one or more antenna ports, and wherein the one or more reference signals are received having one or more second polarizations; and means for sending one or more polarization indicators indicating the one or more first polarizations and the one or more antenna ports.

Clause 57. The second network node of clause 56, wherein the one or more polarization indicators are sent via: Radio Resource Control (RRC) signaling; one or more Control Elements (CE) of a Medium Access Control (MAC) layer; or Downlink Control Information (DCI) of a Physical Downlink Control Channel (PDCCH).

Clause 58. The second network node of any of clauses 56 to 57, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counterclockwise circular polarizations; or one or more polarization indicators indicating that the one or more first polarizations are one or more elliptical polarizations.

Clause 59. The second network node of any of clauses 56 to 58, wherein: the one or more reference signals are transmitted using one or more time-varying patterns of the one or more first polarizations.

Clause 60. The second network node of clause 59, further comprising: means for sending one or more polarization indicators indicating the one or more time-varying patterns of the one or more first polarizations.

Clause 61. The second network node of any of clauses 59 to 60, wherein: one or more of the one or more time-varying patterns is a pseudo-random pattern.

Clause 62. The second network node of any of clauses 59 to 61, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 63. The second network node of any of clauses 59 to 62, wherein: the one or more time-varying patterns of the one or more first polarizations includes one or more time-varying patterns of linear polarizations, wherein the time-varying patterns of the linear polarizations are transmitted with one or more known phase offsets.

Clause 64. A non-transitory computer-readable medium storing computer-executable instructions that, when executed by a first network node, cause the first network node to: receive, from a second network node, one or more reference signals transmitted using one or more first polarizations known to the first network node, wherein the one or more reference signals are received having one or more second polarizations; and determine whether the one or more reference signals followed a line-of-sight (LOS) path between the first network node and the second network node based on a comparison of signal characteristics related to the one or more first polarizations and signal characteristics related to the one or more second polarizations.

Clause 65. The non-transitory computer-readable medium of clause 64, wherein: the one or more first polarizations known to the first network node include one or more fixed polarizations that are always associated with one or more antenna ports.

Clause 66. The non-transitory computer-readable medium of clause 65, wherein: the one or more first polarizations known to the first network node are one or more circular polarizations.

Clause 67. The non-transitory computer-readable medium of clause 64, further comprising computer-executable instructions that, when executed by the first network node, cause the first network node to: receive one or more polarization indicators indicating the one or more first polarizations.

Clause 68. The non-transitory computer-readable medium of clause 67, wherein: the one or more polarization indicators indicate one or more antenna ports associated with the one or more first polarizations.

Clause 69. The non-transitory computer-readable medium of any of clauses 67 to 68, wherein the one or more polarization indicators are received via: Radio Resource Control (RRC) signaling; one or more Control Elements (CE) of a Medium Access Control (MAC) layer; or Downlink Control Information (DCI) of a Physical Downlink Control Channel (PDCCH).

Clause 70. The non-transitory computer-readable medium of any of clauses 67 to 69, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counterclockwise circular polarizations; or one or more polarization indicators indicating that the one or more first polarizations are one or more elliptical polarizations.

Clause 71. The non-transitory computer-readable medium of any of clauses 64 to 70, wherein: the one or more reference signals are transmitted using one or more time-varying patterns of the one or more first polarizations.

Clause 72. The non-transitory computer-readable medium of clause 71, wherein: one or more of the one or more time-varying patterns is a pseudo-random pattern.

Clause 73. The non-transitory computer-readable medium of any of clauses 71 to 72, further comprising computer-executable instructions that, when executed by the first network node, cause the first network node to: receive one or more polarization indicators indicating the one or more time-varying patterns of the one or more first polarizations.

Clause 74. The non-transitory computer-readable medium of any of clauses 71 to 73, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 75. The non-transitory computer-readable medium of any of clauses 71 to 74, wherein: determine whether the one or more reference signals followed the LOS path comprises determining a total received signal energy of the one or more reference signals transmitted using the one or more time-varying patterns of the one or more first polarizations as averaged over one or more periods of the time-varying pattern of the one or more first polarizations.

Clause 76. The non-transitory computer-readable medium of any of clauses 71 to 75, wherein: the one or more time-varying patterns of the one or more first polarizations includes one or more time-varying patterns of linear polarizations, wherein the time-varying patterns of the linear polarizations are transmitted with one or more known phase offsets; and determining whether the one or more reference signals followed the LOS path comprises determining whether the one or more known phase offsets are preserved when the one or more reference signals are received at the first network node.

Clause 77. A non-transitory computer-readable medium storing computer-executable instructions that, when executed by a second network node, cause the second network node to: determine one or more first polarizations associated with one or more antenna ports; send, one or more reference signals transmitted on the one or more antenna ports, wherein the one or more reference signals are transmitted on the one or more antenna ports with the one or more first polarizations known to be associated with the one or more antenna ports, and wherein the one or more reference signals are received having one or more second polarizations; and send one or more polarization indicators indicating the one or more first polarizations and the one or more antenna ports.

Clause 78. The non-transitory computer-readable medium of clause 77, wherein the one or more polarization indicators are sent via: Radio Resource Control (RRC) signaling; one or more Control Elements (CE) of a Medium Access Control (MAC) layer; or Downlink Control Information (DCI) of a Physical Downlink Control Channel (PDCCH).

Clause 79. The non-transitory computer-readable medium of any of clauses 77 to 78, wherein the one or more polarization indicators comprise: one or more polarization indicators indicating that the one or more first polarizations are one or more linear polarizations; one or more polarization indicators indicating that the one or more first polarizations are one or more circular polarizations; one or more polarization indicators indicating that the one or more first polarizations are one or more clockwise circular polarizations; one or more polarization indicators indicating that the one or more first polarizations are one or more counter-clockwise circular polarizations; or one or more polarization indicators indicating that the one or more first polarizations are one or more elliptical polarizations.

Clause 80. The non-transitory computer-readable medium of any of clauses 77 to 79, wherein: the one or more reference signals are transmitted using one or more time-varying patterns of the one or more first polarizations.

Clause 81. The non-transitory computer-readable medium of clause 80, further comprising computer-executable instructions that, when executed by the second network node, cause the second network node to: send one or more polarization indicators indicating the one or more time-varying patterns of the one or more first polarizations.

Clause 82. The non-transitory computer-readable medium of any of clauses 80 to 81, wherein: one or more of the one or more time-varying patterns is a pseudo-random pattern.

Clause 83. The non-transitory computer-readable medium of any of clauses 80 to 82, wherein the one or more time-varying patterns of the one or more first polarizations comprise: one or more time-varying patterns of orthogonal linear polarizations; one or more time-varying patterns of linear polarizations having known phase offsets; one or more time-varying patterns of clockwise or counterclockwise circular polarizations; and one or more time-varying patterns of orthogonal elliptical polarizations.

Clause 84. The non-transitory computer-readable medium of any of clauses 80 to 83, wherein: the one or more time-varying patterns of the one or more first polarizations includes one or more time-varying patterns of linear polarizations, wherein the time-varying patterns of the linear polarizations are transmitted with one or more known phase offsets.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of determining a line-of-sight (LOS) condition performed by a first network node, comprising:
receiving, from a second network node, one or more reference signals transmitted using one or more first polarizations including one or more time-varying polarization patterns known to the first network node and a designated time over which the reference signals transmitted using the one or more first polarizations are transmitted, wherein the one or more reference signals are received having one or more second polarizations; and
determining whether the one or more reference signals followed a LOS path between the first network node and the second network node based on a comparison of signal characteristics related to the one or more first polarizations, and signal characteristics related to the one or more second polarizations, wherein the signal characteristics related to the one or more second polarizations includes a first received signal energy of the one or more reference signals along a first axis of polarization and a second received signal energy of the one or more reference signals along a second axis of polarization, wherein the first received energy and the second received energy are determined based on a time period longer than the designated period.

2. The method of claim 1, further comprising:
receiving one or more polarization indicators indicating the one or more time-varying polarization patterns and one or more indicators indicating the designated time period.

3. The method of claim 2, wherein:
the one or more polarization indicators indicate one or more antenna ports associated with the one or more time-varying polarization patterns.

4. The method of claim 2, wherein the one or more polarization indicators and one or more indicators indicating the designated time period are received via:
Radio Resource Control (RRC) signaling;
one or more Control Elements (CE) of a Medium Access Control (MAC) layer; or
Downlink Control Information (DCI) of a Physical Downlink Control Channel (PDCCH).

5. The method of claim 2, wherein the one or more polarization indicators comprise:
one or more polarization indicators indicating that the one or more first polarizations are one or more linear polarizations;
one or more polarization indicators indicating that the one or more first polarizations are one or more circular polarizations;
one or more polarization indicators indicating that the one or more first polarizations are one or more clockwise circular polarizations;
one or more polarization indicators indicating that the one or more first polarizations are one or more counter-clockwise circular polarizations; or
one or more polarization indicators indicating that the one or more first polarizations are one or more elliptical polarizations.

6. The method of claim 1, wherein the one or more time-varying polarization patterns of the one or more first polarizations comprise:
one or more time-varying polarization patterns of orthogonal linear polarizations;
one or more time-varying polarization patterns of linear polarizations having known phase offsets;
one or more time-varying polarization patterns of clockwise or counterclockwise circular polarizations; and
one or more time-varying polarization patterns of orthogonal elliptical polarizations.

7. The method of claim 1, wherein:
the one or more time-varying polarization patterns of the one or more first polarizations includes one or more time-varying polarization patterns of linear polarizations, wherein the one or more time-varying polarization patterns of the linear polarizations are transmitted with one or more known phase offsets; and
determining whether the one or more reference signals followed the LOS path further comprises determining whether the one or more known phase offsets are preserved when the one or more reference signals are received at the first network node.

8. The method of claim 1, wherein:
the first received signal energy and the second received signal energy are each based on an average signal energy.

9. A first network node, comprising:
a memory;
at least one transceiver; and
at least one processor communicatively coupled to the memory and the at least one transceiver, the at least one processor configured to:
receive, via the at least one transceiver, from a second network node, one or more reference signals transmitted using one or more first polarizations including one or more time-varying polarization patterns known to the first network node and a designated time over which the reference signals transmitted using the one or more first polarizations are transmitted, wherein the one or more reference signals are received having one or more second polarizations; and
determine whether the one or more reference signals followed a line-of-sight (LOS) path between the first network node and the second network node based on a comparison of signal characteristics related to the one or more first polarizations, and signal characteristics related to the one or more second polarizations, wherein the signal characteristics related to the one or more second polarizations include a first received signal energy of the one or more reference signals along a first axis of polarization and a second received signal energy of the one or more reference signals along a second axis of polarization, wherein the first received energy and the second received energy are determined based on a time period longer than the designated period.

10. The first network node of claim 9, wherein the at least one processor is further configured to:
receive, via the at least one transceiver, one or more polarization indicators indicating the one or more first polarizations, one or more designated time indicators indicating the designated time, and one or more antenna ports associated with the one or more first polarizations.

11. The first network node of claim 10, wherein the one or more polarization indicators and the one or more designated time indicators indicating the designated time are received via:
Radio Resource Control (RRC) signaling;
one or more Control Elements (CE) of a Medium Access Control (MAC) layer; or
Downlink Control Information (DCI) of a Physical Downlink Control Channel (PDCCH).

12. The first network node of claim 10, wherein the one or more time-varying polarization patterns of the one or more first polarizations comprise:
one or more time-varying polarization patterns of orthogonal linear polarizations;
one or more time-varying polarization patterns of linear polarizations having known phase offsets;
one or more time-varying polarization patterns of clockwise or counterclockwise circular polarizations; and
one or more time-varying polarization patterns of orthogonal elliptical polarizations.

13. The first network node of claim 9, wherein:
the first received signal energy and the second received signal energy are each based on an average signal energy.

* * * * *